(12) United States Patent
Cotton

(10) Patent No.: US 12,280,524 B2
(45) Date of Patent: Apr. 22, 2025

(54) MAGNETORHEOLOGICAL FLUID VALVE AND VARIABLE MANUFACTURING MOLD

(71) Applicant: Shoreline Design & Manufacturing LLC, Stratford, CT (US)

(72) Inventor: Eric Cotton, Stratford, CT (US)

(73) Assignee: Shoreline Design &Manufacturing LLC, Stratford, CT (US)

( * ) Notice: Subject to any disclaimer, the term of this patent is extended or adjusted under 35 U.S.C. 154(b) by 0 days.

(21) Appl. No.: 18/011,998

(22) PCT Filed: Jun. 21, 2021

(86) PCT No.: PCT/US2021/038219
§ 371 (c)(1),
(2) Date: Dec. 21, 2022

(87) PCT Pub. No.: WO2021/262588
PCT Pub. Date: Dec. 30, 2021

(65) Prior Publication Data
US 2023/0211525 A1 Jul. 6, 2023

Related U.S. Application Data

(60) Provisional application No. 63/041,967, filed on Jun. 21, 2020.

(51) Int. Cl.
*B29C 33/30* (2006.01)
*F16K 13/10* (2006.01)
*F16K 31/06* (2006.01)

(52) U.S. Cl.
CPC ............ *B29C 33/308* (2013.01); *F16K 13/10* (2013.01); *F16K 31/06* (2013.01)

(58) Field of Classification Search
CPC ....... B29C 33/308; F16K 31/06; F16K 13/10; F15B 15/1404; F15B 21/065;
(Continued)

(56) References Cited

U.S. PATENT DOCUMENTS

| 5,738,345 A | 4/1998 | Schroeder et al. |
| 6,095,486 A | 8/2000 | Ivers et al. |

(Continued)

FOREIGN PATENT DOCUMENTS

| CN | 1314903 C | 5/2007 |
| CN | 103591363 B | 2/2014 |

(Continued)

OTHER PUBLICATIONS

Dominguez, Gonzalo Aguirre, et al. "Development of a backdrivable magnetorheological hydraulic piston for passive and active linear actuation." 2015 IEEE/RSJ International Conference on Intelligent Robots and Systems (IROS). IEEE, 2015. (Year: 2015).*

(Continued)

*Primary Examiner* — Yunju Kim
(74) *Attorney, Agent, or Firm* — Womble Bond Dickinson (US) LLP

(57) ABSTRACT

A variable mold includes a plurality of hydraulic pin systems. Each pin system includes a valve in fluid communication with a supply of pressurized fluid, a tubing in fluid communication with the valve, and a pin coupled to the tubing. The pin is configured to extend from the tubing in response to the supply of the fluid through the valve to the tubing. A longitudinal axis of each pin is mutually parallel and arranged in a two-dimensional array. The variable mold includes a controller operably coupled to the valves that can control the displacement of each pin. The variable mold may include a pin displacement detector configured to detect a displacement of each pin. The pin displacement detector is operably coupled to the controller. The controller can close each valve in response to the pin displacement detector detecting that the pin corresponding to the valve extends a predetermined distance.

18 Claims, 29 Drawing Sheets

(58) Field of Classification Search
CPC .... F15B 2211/3138; F15B 2211/31529; F15B 2211/31541; F15B 2211/885

See application file for complete search history.

(56) References Cited

U.S. PATENT DOCUMENTS

| | | | |
|---|---|---|---|
| 6,354,561 | B1 | 3/2002 | Fahrion |
| 6,558,590 | B1 | 5/2003 | Stewart |
| 7,257,460 | B2* | 8/2007 | Venugopal ............. B30B 15/26 700/146 |
| 8,057,206 | B1 | 11/2011 | McKnight |
| 8,302,327 | B2* | 11/2012 | Battlogg .............. F16K 31/082 280/281.1 |
| 9,539,739 | B2 | 1/2017 | Ruthrauff |
| 2008/0023278 | A1* | 1/2008 | Wereley ............... F16F 9/3415 188/267.2 |
| 2010/0199519 | A1* | 8/2010 | Battlogg ................ F16K 13/10 36/83 |
| 2012/0279812 | A1* | 11/2012 | Peters ............... G05B 19/4099 700/275 |
| 2016/0153508 | A1* | 6/2016 | Battlogg .................. A61F 2/38 188/267.2 |
| 2018/0222107 | A1* | 8/2018 | Hall ........................ B29C 51/30 |
| 2020/0257369 | A1* | 8/2020 | Battlogg ................ B60K 37/06 |

FOREIGN PATENT DOCUMENTS

| | | |
|---|---|---|
| CN | 105782324 A | 7/2016 |
| DE | 102015011633 A | 3/2017 |
| JP | 2009-068571 | 4/2009 |
| JP | 2016-142320 | 8/2016 |
| KR | 10-2019-0020460 | 3/2019 |
| KR | 20200005085 A | 1/2020 |

OTHER PUBLICATIONS

Adapa Adaptive Moulds, Adaptive moulds foraffordable, sustainable, and smarter production of curved surfaces, Product Brochure, 16 pgs., https://adapamoulds.com/.

Adapa Adaptive Moulds, The Adaptive Mould™ and its Components, 4 pgs., https://adapamoulds.com/.

Adapa Adaptive Moulds, The Adaptive Mould™ Workflow,4 pgs., https://adapamoulds.com/.

Composites World, Reconfigurable tooling: Revolutionizing composites manufacturing, Sep. 20, 2017, 12 pgs., https://www.compositesworld.com/articles/reconfigurable-tooling-revolutionizing-composites-manufacturing.

Follmer et al., inFORM: Dynamic Physical Affordances and Constraints through Shape and Object Actuation, MIT Media Lab, Cambridge, MA, UIST 2013—Proceedings of the 26th Annual ACM Symposium on User Interface Software and Technology. 417-426. 10.1145/2501988.2502032, 10 pgs.

Grunwald et al., Design of magneto-rheological (MR) valve, Dublin City University, Dublin, Ireland, 2008, 25 pgs.

International Searching Authority; International Search Report and Written Opinion of the International Searching Authority for PCT/US2021/38219; mailed on Oct. 21, 2021; 11 pages.

Eithinger et al., Physical Telepresence: Shape Capture and Display for Embodied, Computer-mediated Remote Collaboration, MIT Media Lab, Cambridge, MA, 2014, 10 pgs.

Lord Technical Data, MRF-140BC Magneto-Rheological Fluid, 2019, 2 pgs., www.lord.com.

Lord Technical Data, MRF-140CG Magneto-Rheological Fluid, Jun. 2019, 2 pgs., www.lord.com.

Papazian, Tools of Change—Reconfigurable forming dies raise the efficiency of small-lot production, Mechanical Engineering, 52-55., Feb. 2002, 4 pgs.

Peters, Design and Fabrication of A Digitally Reconfigurable Surface, presented to Massachusetts Institute of Technology, Jun. 2011, 36 pgs.

Ren, Gallium-based liquid metals and their hybrids as smart electronic materials, University of Wollongong Australia, 2018, 111 pgs.

Japanese Patent Office; Office Action issued for Japanese Application No. 2022-578685 dated Jun. 27, 2023; 7 pages.

Korean Patent Office; Office Action issued for Korean Application No. 10-2023-7002190 dated Aug. 24, 2023, 3 pages.

European Patent Office; European Search Report issued for EP 21830232.1 dated Jun. 3, 2024, 7 pages.

Japanese Patent Office; Decision to Grant a Patent issued for JP 2022-578685 dated Oct. 17, 2023; 3 pages.

Korean Patent Office; Non-Final Rejection issued for KR 2023-7002190 dated Dec. 22, 2023; 5 pages.

Korean Patent Office; Final Rejection issued for KR 2023-7002190 dated Jul. 31, 2024, 3 pages.

\* cited by examiner

MAGNETORHEOLOGICAL FLUID VALVE AND VARIABLE MANUFACTURING MOLD

CROSS-REFERENCE TO RELATED APPLICATIONS

This application is a national stage entry of International Application No. PCT/US21/038219 filed Jun. 21 2021, which claims priority to U.S. Provisional Application 63/041,967, filed Jun. 21, 2020, the entire contents of which are incorporated herein by reference.

BACKGROUND OF THE DISCLOSURE

This disclosure is related, in general, to a variable mold, and in particular to a variable mold that uses magnetorheological fluid and magnetorheological valves to adjust and configure the variable mold.

Molds are used for a variety of manufacturing processes. One drawback to using molds is that even small changes in the product will require a new mold to be made. This introduces a significant cost of time and money in applications where the molded product is frequently changed, such as in custom manufacturing, or in research and development, where it may be necessary to test many different variations of a molded article.

While variable molds may be available, conventional variable molds are limited in their application due to the low resolution available. For example, conventional variable molds may only be able to produce large scale articles with large curvature radius. Additionally, due to the low resolution of conventional variable molds, an interpolation layer may be required to lay over the mold to smooth the surface between each point of the variable mold. Further, the control systems for conventional variable molds may require complex electromechanical actuators, servos, and/or stepping motors.

Accordingly, there may be a need for a variable mold with a high resolution, simple control mechanism, and that does not require an interpolation layer.

BRIEF DESCRIPTION OF EXEMPLARY EMBODIMENTS

In an aspect, the disclosure is directed to a valve for use with a magnetorheological fluid. The valve includes a hollow cylinder extending in a longitudinal direction. The hollow cylinder includes a cylinder first end, a cylinder second end, and a cylinder interior. Also, the valve includes a center rod provided in the cylinder interior. The center rod includes a rod first end and a rod second end.

The valve has a first spacer cylinder provided on the center rod in the longitudinal direction, and a second spacer cylinder provided on the center rod at a second position in the longitudinal direction. The valve further includes a first end plate comprising a first flow opening extending through a thickness of the first end plate, and a second end plate comprising a second flow opening extending through a thickness of the second end plate. The first end plate is coupled to the rod first end and the second end plate is coupled to the rod second end.

Also, the valve includes a wire coil provided on an exterior of the hollow cylinder at a third position in the longitudinal direction. The third position is between the first position and the second position. An outer diameter of the first spacer cylinder and an outer diameter of the second spacer cylinder are less than an inner diameter of the hollow cylinder.

In another aspect, the disclosure is directed to a method for use of a magnetorheological fluid valve. The method includes providing a magnetorheological fluid valve. The valve includes a hollow cylinder extending in a longitudinal direction. The hollow cylinder includes a cylinder first end, a cylinder second end, and a cylinder interior. Also, the valve includes a center rod provided in the cylinder interior. The center rod includes a rod first end and a rod second end. The valve has a first spacer cylinder provided on the center rod in the longitudinal direction, and a second spacer cylinder provided on the center rod at a second position in the longitudinal direction. The valve further includes a first end plate comprising a first flow opening extending through a thickness of the first end plate, and a second end plate comprising a second flow opening extending through a thickness of the second end plate. The first end plate is coupled to the rod first end and the second end plate is coupled to the rod second end. Also, the valve includes a wire coil provided on an exterior of the hollow cylinder at a third position in the longitudinal direction. The third position is between the first position and the second position. An outer diameter of the first spacer cylinder and an outer diameter of the second spacer cylinder are less than an inner diameter of the hollow cylinder.

The method further includes supplying the magnetorheological fluid to the cylinder first end under pressure such that the magnetorheological fluid passes through first flow hole, through the hollow cylinder, and out through the second flow hole. Also, the method includes selectively passing an electrical current through the wire coil to increase a viscosity of the magnetorheological fluid and thereby stop the flow of the magnetorheological fluid.

In another aspect, the disclosure is directed to a variable mold. The variable mold includes a plurality of hydraulic pin systems. Each hydraulic pin system includes a valve in fluid communication with a supply of pressurized fluid, a tubing in fluid communication with the valve, and a pin coupled to the tubing. The pin is configured for displacement from the tubing in response to the supply of the fluid through the valve to the tubing. A longitudinal axis of each pin of the plurality of hydraulic pin systems is mutually parallel and arranged in a two-dimensional array. Also, the variable mold includes a controller operably coupled to the valves of the plurality of hydraulic pin systems. The controller is configured to control the displacement of each pin of the plurality of hydraulic pin systems.

BRIEF DESCRIPTION OF THE DRAWINGS

A more particular description will be rendered by reference to exemplary embodiments that are illustrated in the accompanying figures. Understanding that these drawings depict exemplary embodiments and do not limit the scope of this disclosure, the exemplary embodiments will be described and explained with additional specificity and detail through the use of the accompanying drawings in which.

Figure 1:
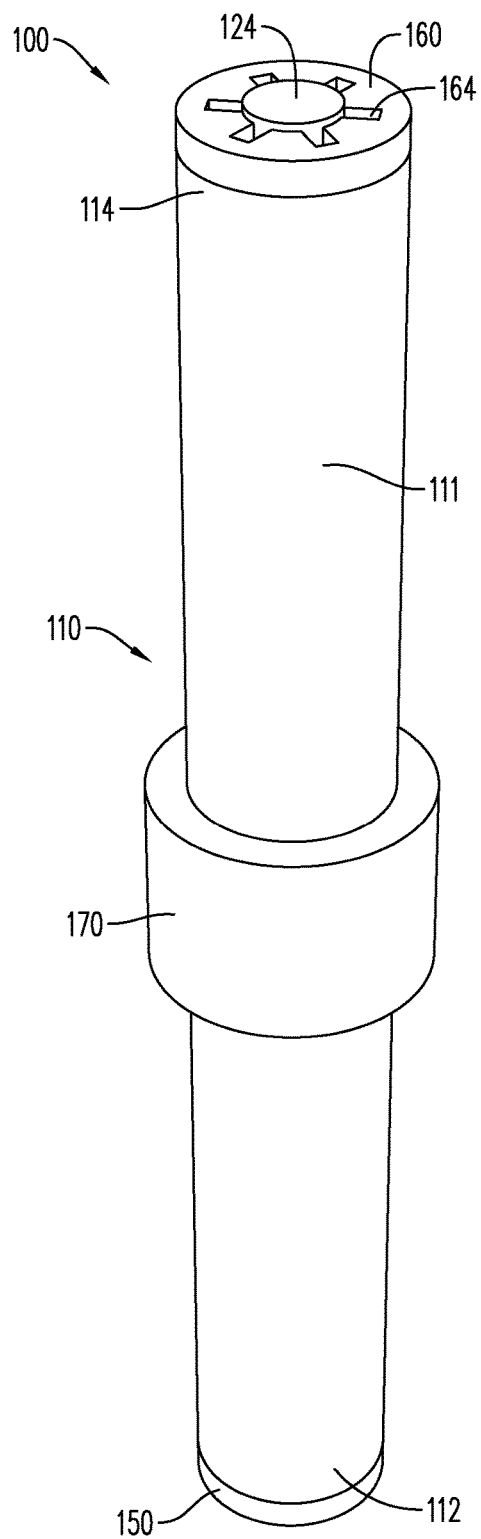
FIG. 1 is a perspective view of a magnetorheological (MR) fluid valve according to an exemplary embodiment.

Various features, aspects, and advantages of the exemplary embodiments will become more apparent from the following detailed description, along with the accompanying drawings in which like numerals represent like components throughout the figures and detailed description. The various described features are not necessarily drawn to scale in the drawings but are drawn to emphasize specific features relevant to some embodiments.

The headings used herein are for organizational purposes only and are not meant to limit the scope of the disclosure or the claims. To facilitate understanding, reference numerals have been used, where possible, to designate like elements common to the figures.

DETAILED DESCRIPTION

Reference will now be made in detail to various embodiments. Each example is provided by way of explanation and is not meant as a limitation and does not constitute a definition of all possible embodiments.

Figure 2:
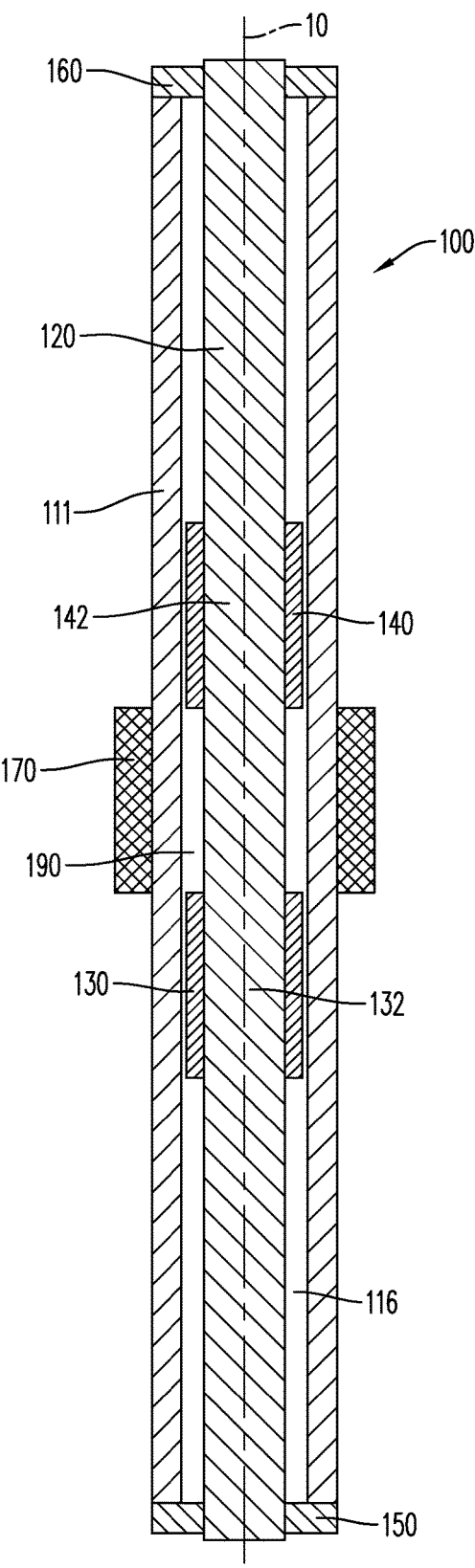
FIG. 2 is a cross section view of an MR fluid valve according to an exemplary embodiment.
Figure 4:
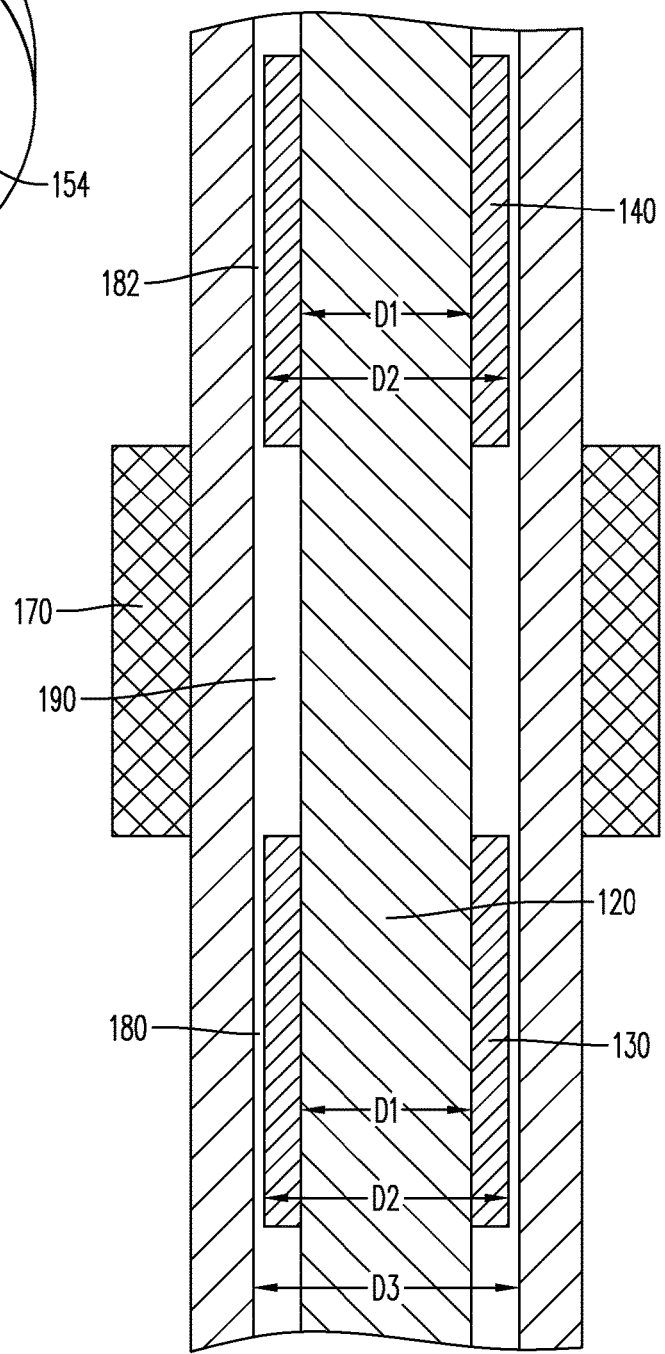
FIG. 4 is an enlarged cross section view of an MR fluid valve according to an exemplary embodiment.

FIGS. 1-2 and 4 show an exemplary embodiment of a magnetorheological (MR) fluid valve 100. The MR fluid valve 100 may include a hollow cylinder 110, a center rod 120 (FIG. 2 and FIG. 4), a first spacer cylinder 130 (FIG. 2 and FIG. 4), a second spacer cylinder 140 (FIG. 2 and FIG. 4), a first end plate 150, a second end plate 160, and a wire coil 170.

As illustrated in FIG. 2, for example, the hollow cylinder 110 may extend along in a longitudinal direction, i.e., along longitudinal axis 10. The hollow cylinder 100 may include a cylinder wall 111 and a cylinder interior 116 defined by the cylinder wall 111. The hollow cylinder 100 may further include a cylinder first end 112 and a cylinder second 114 opposite the cylinder first end 112 and extending along the longitudinal axis 10.

The center rod 120 may be contained within the cylinder interior 116. The center rod 120 may include a rod first end 122 and a rod second end 124. The center rod 120 may be formed of a high permeability material. In an exemplary embodiment, the high permeability material may be a ferromagnetic material such as iron.

The first spacer cylinder 130 may be hollow with a spacer inner diameter D1 (see FIG. 4) dimensionally configured such that the first spacer cylinder 130 may be fitted over the center rod 120. The spacer inner diameter D1 may be configured such that the first spacer cylinder 130 remains axially fixed on the center rod 120 via frictional engagement or an adhesive, solder, welding, crimping, press fitting, friction stir welding, or other suitable joining method with the center rod 120. The first spacer cylinder 130 may be positioned at a first position 132 (see FIG. 2) along the longitudinal axis 10.

The second spacer cylinder 140 may be hollow with the inner diameter sized D1 (see FIG. 4) such that the second spacer cylinder 140 may be fitted over the center rod 120. The second spacer cylinder 130 may be positioned at a second position 142 (FIG. 2) along the longitudinal axis 10. The spacer inner diameter D1 may be configured such that the second spacer cylinder 140 remains axially fixed on the center rod 120 via frictional engagement or an adhesive, solder, welding, crimping, press fitting, friction stir welding, or other suitable joining method with the center rod 120. The second position 142 may be different than the first position 132.

The first spacer cylinder 130 and the second spacer cylinder 140 may each have a spacer outer diameter D2 (see FIG. 4). The hollow cylinder 110 may have a cylinder inner diameter D3 (see FIG. 4). In an exemplary embodiment, the spacer outer diameter D2 is less than the cylinder inner diameter D3 such that a first channel 180 is formed between the first spacer cylinder 130 and the hollow cylinder 110 and a second channel 182 is formed between the second spacer cylinder 140 and the hollow cylinder 110. As illustrated in detail in FIG. 4, an interior chamber 190 may be formed between the central rod 120 and the hollow cylinder 110 at an axial position along the longitudinal axis 10 between the first position 132 and the second position 142 (see also FIG. 2). A diameter of the interior chamber 190 may be larger than a diameter of the first channel 180 and the second channel 182.

Figure 3:
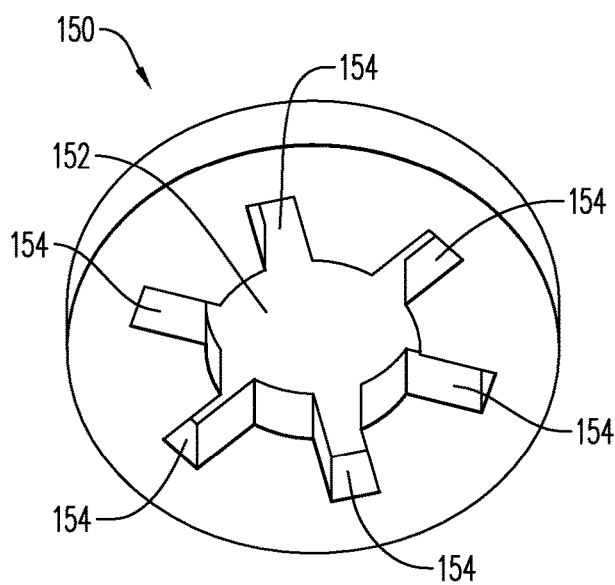
FIG. 3 is a perspective view of an end plate according to an exemplary embodiment.

FIG. 3 shows an exemplary embodiment of the first end plate 150. In an exemplary embodiment, the first end plate 150 and the second end plate 160 may be substantially identical. Accordingly, the features of the first end plate 150 described herein may also apply to the second end plate 160. However, it will be understood that it is not required for the first end plate 150 and the second end plate 160 to be identical, and there may be difference between the first end plate 150 and the second end plate 160 as may be required in a particular application. The first end plate 150 may include a first rod hole 152. The first rod hole 152 may be dimensionally configured to as to receive an end of the central rod 120. The end plates 150 or 160 are attached to the center rod 120 via frictional engagement or an adhesive, solder, welding, crimping, press fitting, friction stir welding, or other suitable joining method with the center rod. The first end plate 150 may further include a first flow hole 154 extending through a thickness of the first end plate 152. In an exemplary embodiment, the first end plate 150 may include a plurality of first flow holes 154. The first flow holes 154 are configured to allow flow of the MR fluid through the first end plate 150 and into the cylinder interior 116 (see FIG. 2). In an exemplary embodiment, the cylinder first end 112 may abut with a surface of the first end plate 150 and the cylinder second end 114 may abut with a surface of the second end plate 160. In this embodiment, the first end plate 150 and the second end plate 160 may be affixed to the hollow cylinder 110 via an adhesive, solder, welding, crimping, press fitting, friction stir welding, or other suitable joining method. In an alternative exemplary embodiment, an outer diameter of the first end plate 150 and the second end plate 160 may be dimensionally configured such that the first end plate 150 and the second end plate 160 may be received within the hollow cylinder 110. In this embodiment, the first end plate 150 and the second end plate 160 may be joined to the hollow cylinder 110 as described above. Alternatively, the first end plate 150 and the second end plate 160 may be axially fixed relative to the hollow cylinder 110 via frictional engagement with the axial cylinder 110.

Figure 4A:
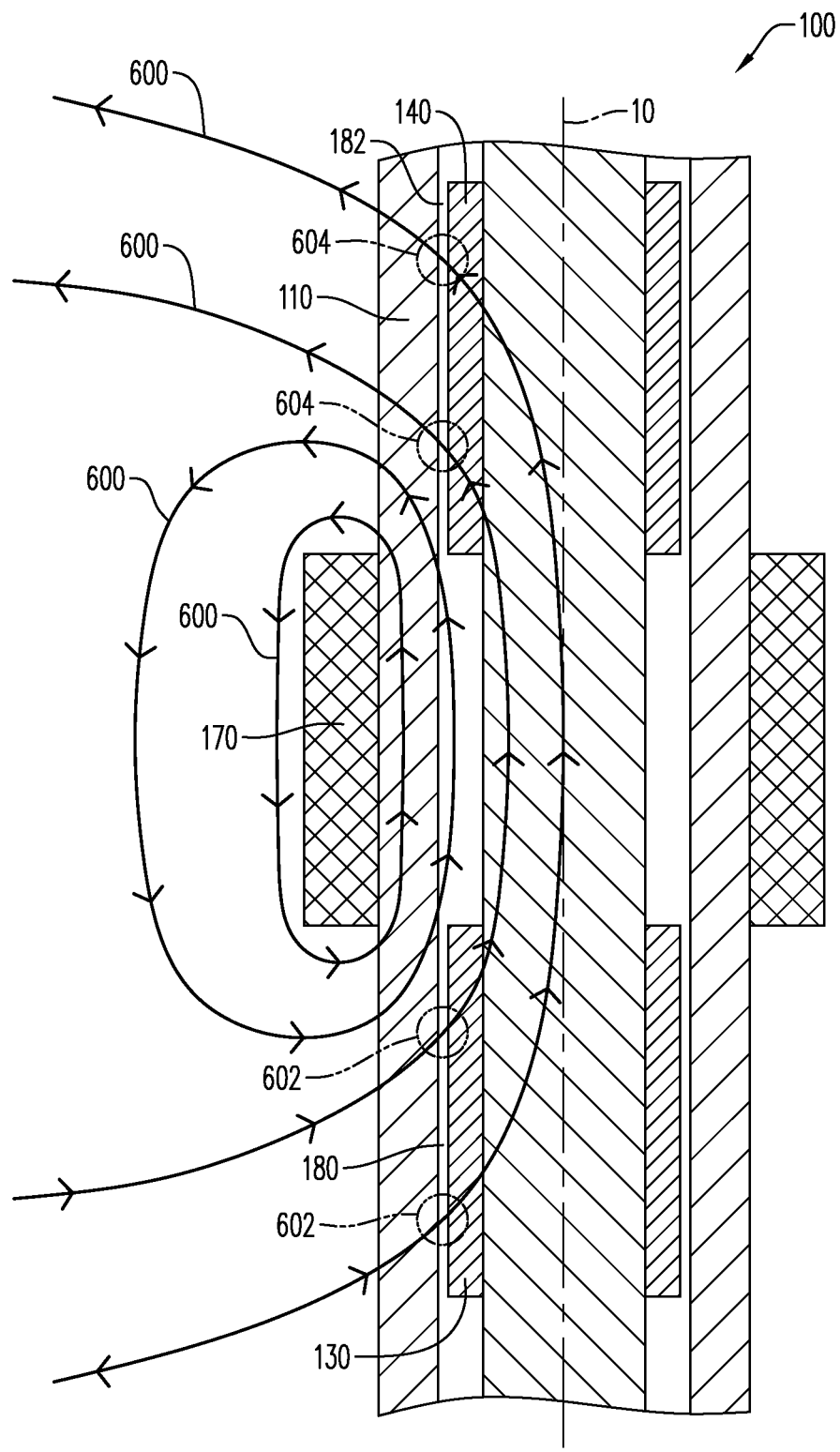
FIG. 4A is an enlarged cross section view of an MR fluid valve showing magnetic field lines according to an exemplary embodiment.

The wire coil 170 may be a wire wrapped circumferentially around the hollow cylinder 110. The wire coil 170 may be dimensionally configured such a magnetic field generated when current is passed through the wire coil is substantially parallel to the longitudinal axis 10 within the interior chamber 190. Additionally, the magnetic field generated by the wire coil 170 may have a significant component perpendicular to the longitudinal axis 10 within the first channel 180 and the second channel 182, i.e., perpendicular to a flow direction of the MR fluid. FIG. 4A shows an exemplary embodiment of the MR fluid valve 100 with magnetic field lines 600. As seen at regions 602, the magnetic field in the first channel 180 has a significant component perpendicular to the longitudinal axis 10. Similarly, it can be seen at regions 604 that the magnetic field in the second channel 182 has a significant component perpendicular to the longitudinal axis 10. It will be understood that the magnetic field lines 600 shown in FIG. 4A are rough approximations only for illustration purposes and are not intended to be an exact indication of the direction magnetic field within the MR fluid valve 100.

When the magnetic field passes through the first channel 180 and the second channel 182, the component of the magnetic field perpendicular to the longitudinal axis 10 may act on the MR fluid and changes its viscosity so as to put the MR fluid in a low flow state. The low flow state of the MR fluid, in combination with a small cross sectional area of the first channel 180 and the second channel 182, may effectively convert the MR fluid into a plug that prevents passage of any further MR fluid through the MR fluid valve 100. Removal of the magnetic field may allow the MR fluid to return to its normal flow state and resume flow through the MR fluid valve 100.

Figure 5:
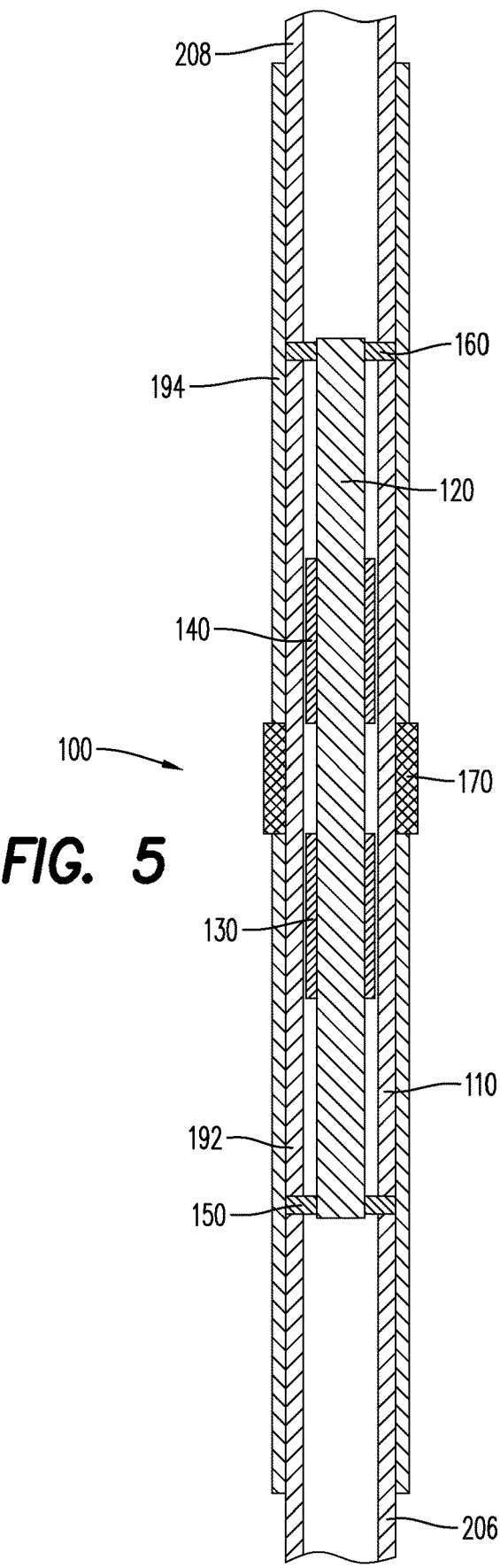
FIG. 5 is a cross section view of an MR fluid valve with couplings according to an exemplary embodiment.

As seen in FIG. 5, a first coupling 192 and a second coupling 194 may be operably coupled to the MR fluid valve 100. The first coupling 192 may put the MR fluid valve 100 in fluid communication with a first tubing 206 that is in fluid communication with an MR fluid supply. The second coupling 194 may put the MR fluid valve 100 in fluid communication with a second tubing 208 that is in fluid communication with a pin assembly as discussed herein.

Figure 6:
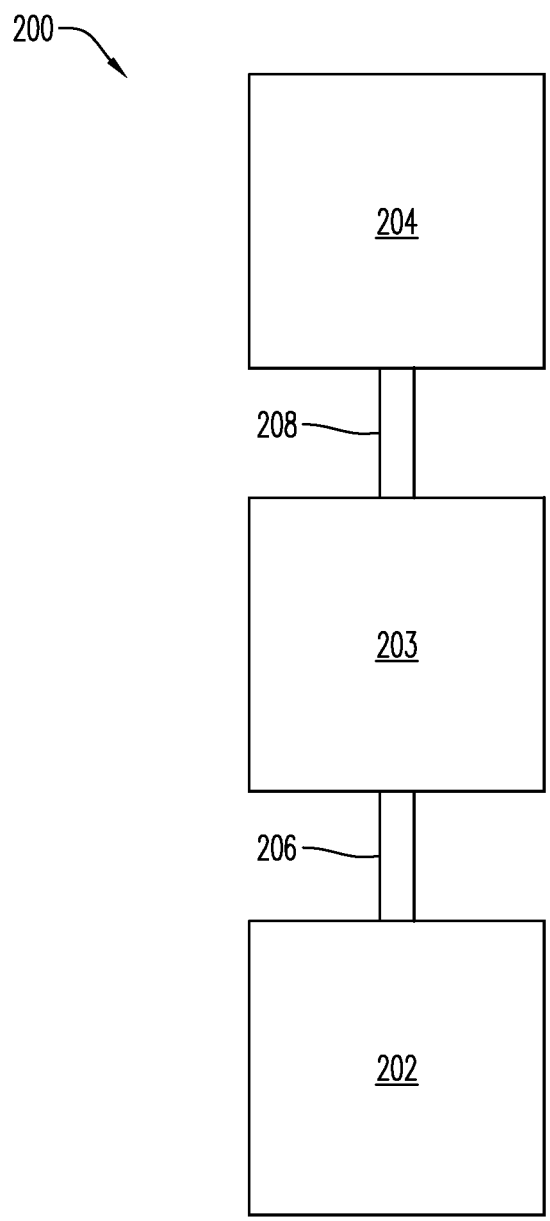
FIG. 6 is a schematic block diagram of a hydraulic pin system according to an exemplary embodiment.

FIG. 6 shows an exemplary embodiment of a hydraulic pin system 200. The hydraulic pin system may include a pump 202 configured to supply a fluid under pressure. In an exemplary embodiment the fluid may be an MR fluid as described herein. The hydraulic pin system 200 may further include a valve 203 configured to regulate flow of the fluid. In an exemplary embodiment, the valve 203 may be an MR fluid valve 100 as described herein. The valve 203 may be in fluid communication with the pump 202 via the first tubing 206. The hydraulic pin system may further include a pin assembly 204. The pin assembly 204 may be in fluid communication with the valve 203 via the second tubing 208.

Figure 7:
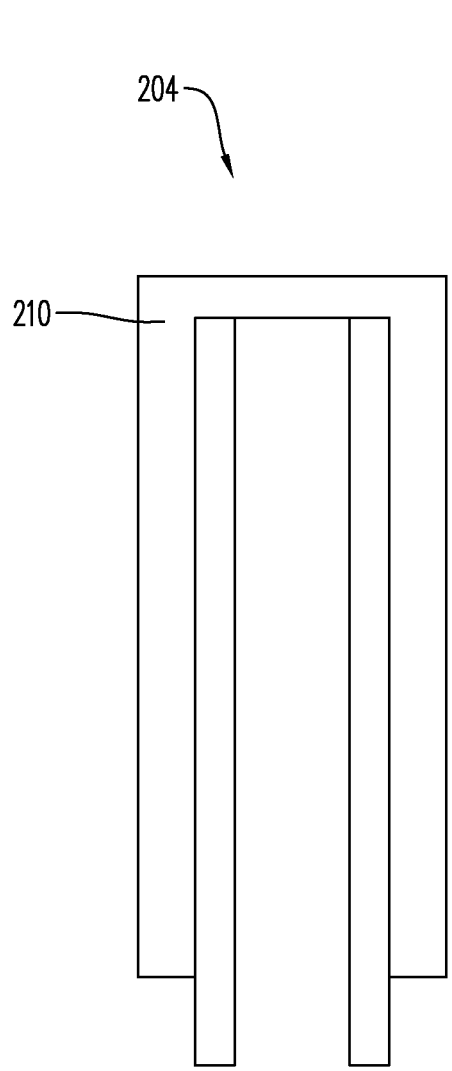
FIG. 7 is a cross section view of a pin assembly according to an exemplary embodiment.
Figure 8:
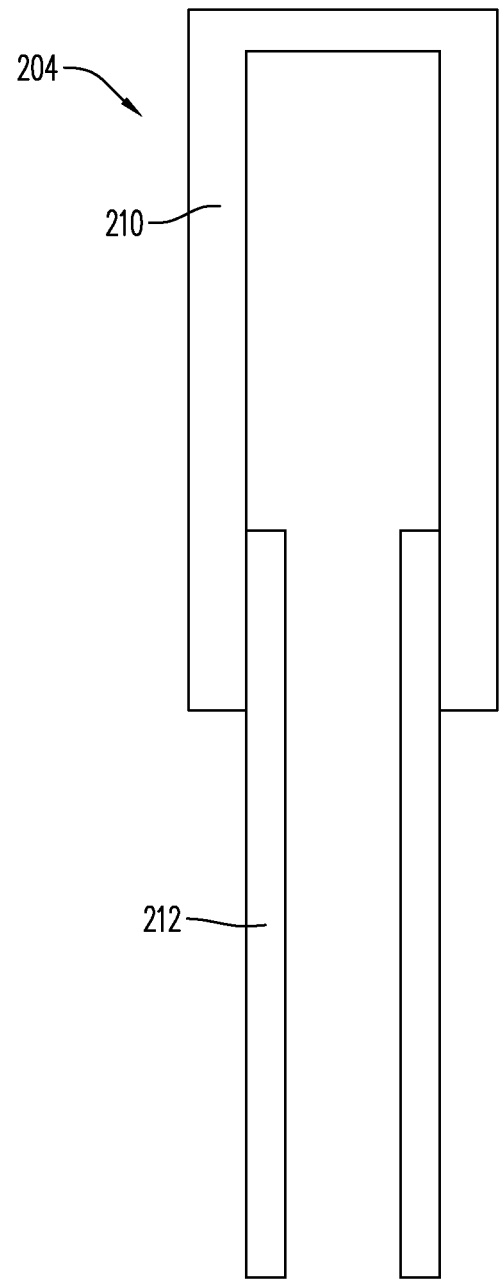
FIG. 8 is a cross section view of the pin assembly of FIG. 7, illustrating a pin in an extended position according to an exemplary embodiment.

FIGS. 7-8 show an exemplary embodiment of the pin assembly 204. The pin assembly may include a pin body 210 and a pin tubing 212. The pin body 210 may be dimensionally configured so as to fit around an exterior of the pin tubing 212. In an exemplary embodiment the pin tubing 212 may be the same structure as the second tubing 208 shown in FIG. 6. In an alternative exemplary embodiment, the pin tubing 212 may be a different structure than the second tubing 208 and may instead be in fluid communication with the second tubing 208.

FIG. 7 shows the pin assembly 204 in a retracted position. As fluid is supplied under pressure into the pin tubing 212, the fluid extends the pin body 210, as seen in FIG. 8. When the valve 203 of FIG. 6 is closed (i.e., activated) to stop fluid flow, the pin body 210 remains in the extended position. When the valve 203 of FIG. 6 is open (i.e., deactivated) fluid flow is permitted to extend or retract the pin body 210.

Figures 9, 10:
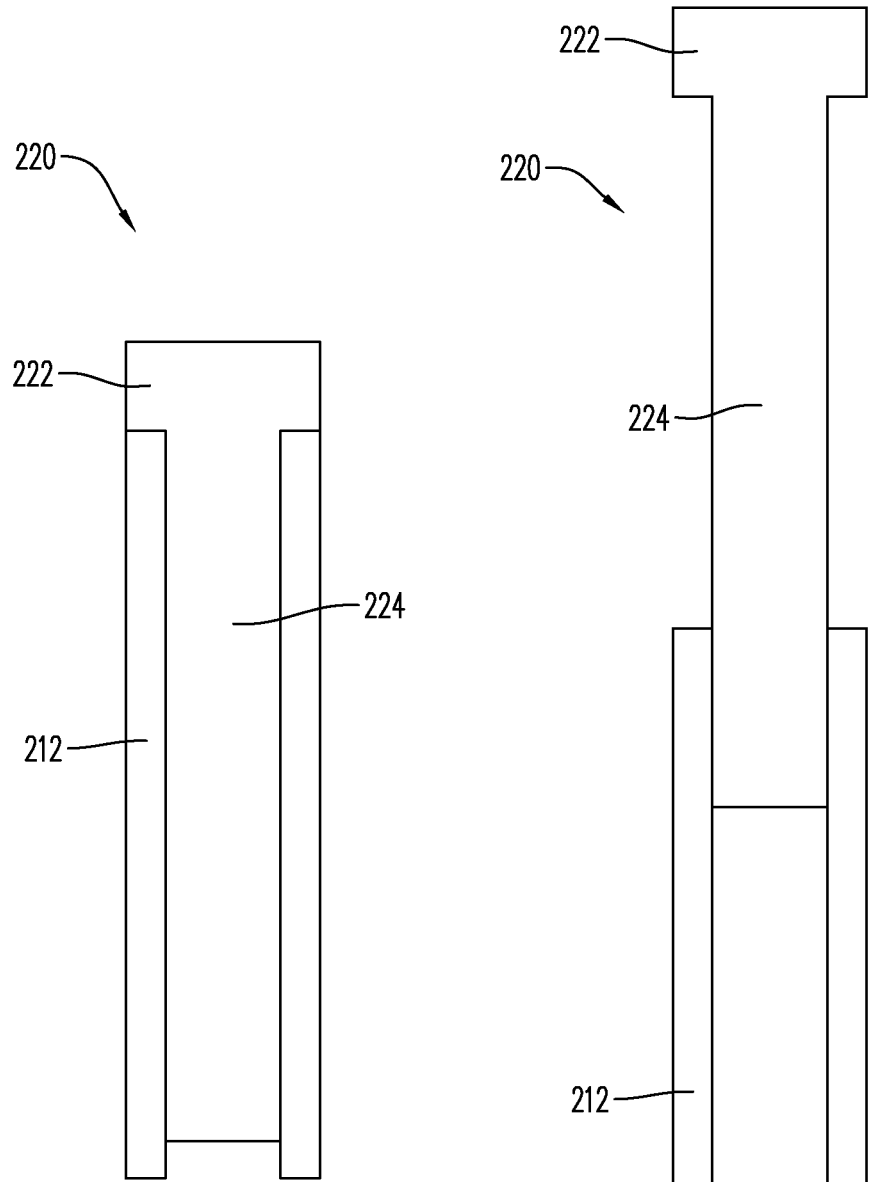
FIG. 9 is a cross section view of a pin assembly according to an exemplary embodiment.
FIG. 10 is a cross section view of the pin assembly of FIG. 9, illustrating a pin in an extended position according to an exemplary embodiment.

FIGS. 9-10 show an exemplary embodiment of a pin assembly 220. In the pin assembly 220, the pin body 210 of FIGS. 7-8 is replaced with a pin shaft 224 and a pin head 222. The pin shaft 222 may be dimensionally configured so as to fit inside the pin tubing 212. FIG. 9 shows the pin assembly 220 in a retracted position. As fluid is supplied under pressure into the pin tubing 212 the fluid extends the pin shaft 224 and the pin head 222. When the valve 203 of FIG. 6 is closed (i.e., activated) to stop fluid flow, the pin shaft 224 and the pin head 222 remain at the extended position. When the valve 203 of FIG. 6 is open (i.e., deactivated) fluid flow is permitted to extend or retract the pin shaft 224 and the pin head 222.

Figure 32:
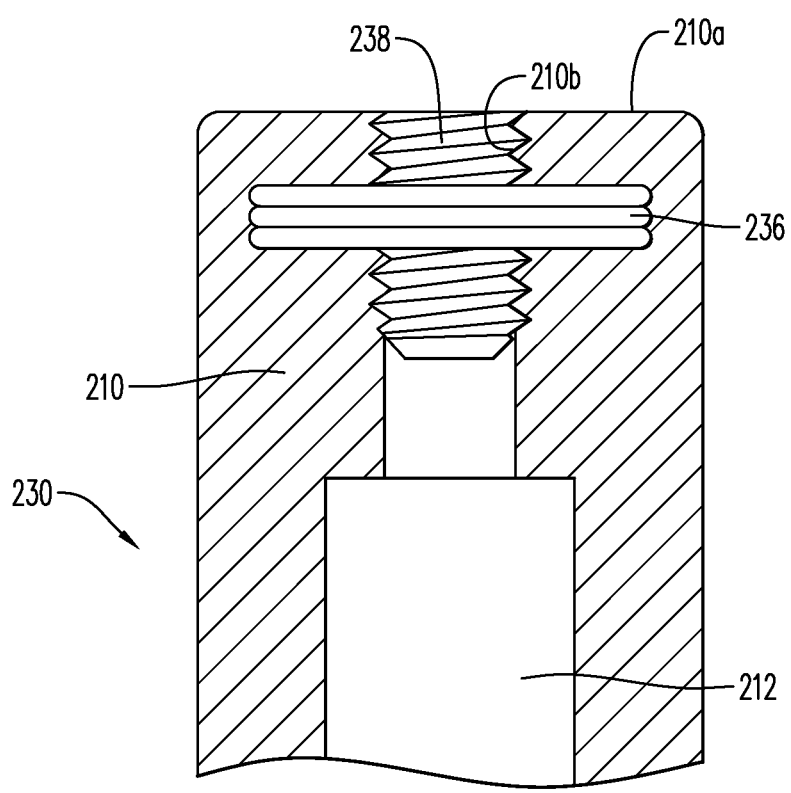
FIG. 32 is a cross section view of a pin assembly according to an exemplary embodiment.

FIG. 32 shows an exemplary embodiment of a pin assembly 230. The pin assembly 230 includes the pin body 210 of FIGS. 7-8, but modified to include at least one of a heating element 236 and a plug 238 at or proximate to a distal end 210a of the pin body 210. The movement of the pin body 210 relative to the tube 212 is otherwise the same as described above with respect to the arrangement shown in FIGS. 7 and 8.

The heating element 236 may be electrically connected to an electrical power source and may be formed as a heating coil. The heating element 236 may be connected to the pin body 210 in various ways, including without limitation, embedding the heating element during a molding operation for forming the pin body 210. Heat generated from the heating element 236 heating may be used to increase the temperature at the distal end 210a of the pin body 210 to aid in curing any moldable material that is adjacent the distal end 210a.

The plug 238 is configured to close an opening 210b in the distal end 210a of the pin body 210. The opening 210b is in fluid communication with the tube 212. Removing the plug 238 permits access to the interior of the pin body 210 and the tube 212, such as for filling or withdrawal of fluid, i.e., magnetorheological fluid. The plug 238 may be a threaded set screw as shown in FIG. 32. As shown in FIG. 32, the heating element 236 may encircle or otherwise surround the plug 238.

Figure 11:
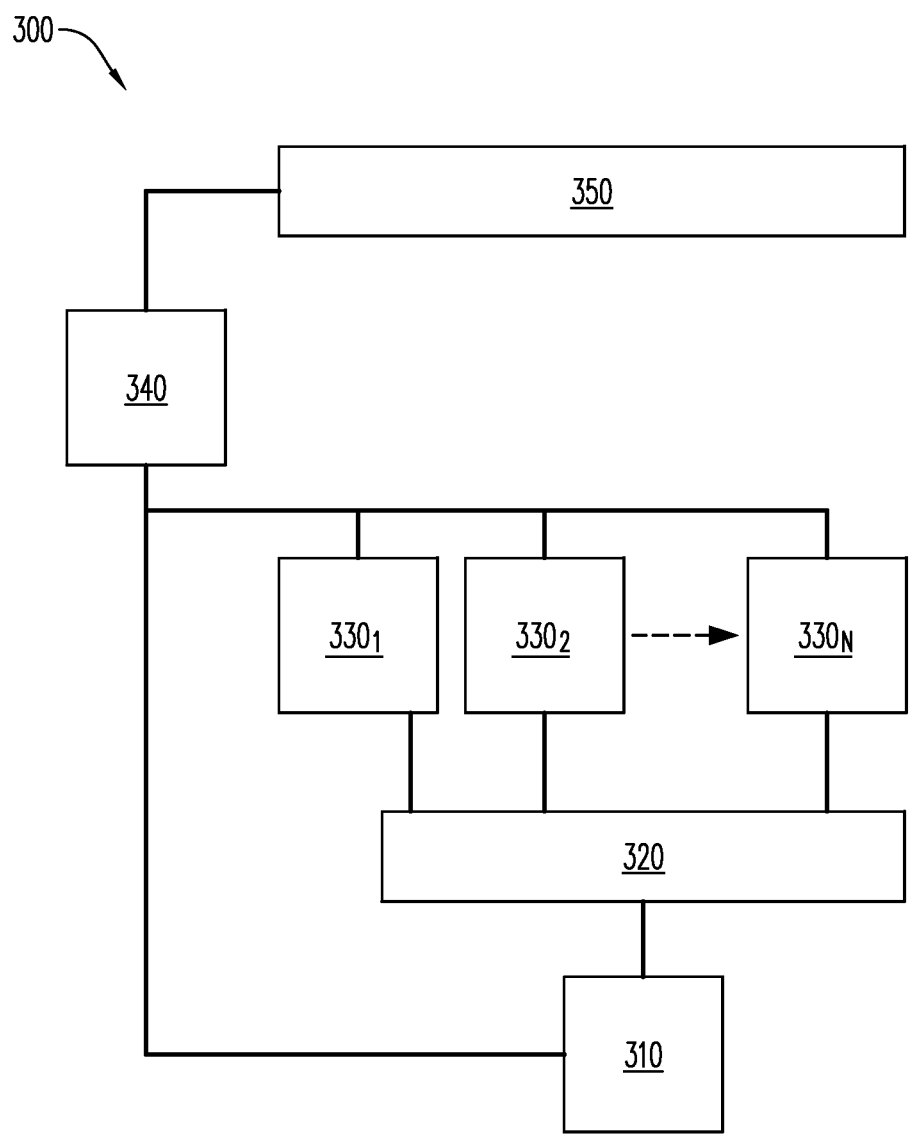
FIG. 11 is a schematic block diagram of a variable mold according to an exemplary embodiment.

FIG. 11 shows an exemplary embodiment of a variable mold 300. The variable mold 300 may include a pump 310, a manifold 320 in fluid communication with the pump 310, a plurality of hydraulic pin systems 330 in fluid communication with the manifold 320, a controller 340 operably coupled to the pump and plurality of hydraulic pin systems 330, and a pin position detector 350 operably coupled to the controller 340. The hydraulic pin systems 330 may include a total of N hydraulic pin systems, N being an integer, arranged such that longitudinal axes of each pin system 330 are substantially parallel and arranged in a two-dimensional matrix. In an exemplary embodiment, each hydraulic pin system 330 may be the hydraulic pin system 200 described with reference to FIG. 6, but without the pump 202 since pump 310 is provided to the variable mold 300. Each hydraulic pin system 330 may include a pin 332 (see FIG. 13).

The pump 310 may supply fluid under pressure to the manifold 320. In an exemplary embodiment, the fluid may be an MR fluid as described herein. The manifold 320 in turn delivers the fluid under pressure to each of the hydraulic pin systems 330. The pin position detector 350 may be configured to detect an extension distance of each pin 332 of the hydraulic pin systems 330 as it extends. For example, the pin position detector 150 may comprise a series of lasers and detectors configured to detect an extension distance based on time of flight of a laser beam to each pin 332. Alternatively, the pin position detector 150 may include one or more cameras configured to capture images of the pins 332. The controller 340 may be configured to use these images to photogrammetrically calculate the positions of the pins 332 based on a known position of the cameras in the pin position detector 150. In an alternative embodiment, each hydraulic pin system 330 may include a flow detector configured to detect an amount of fluid that has flowed through the valve, and this flow detector may be operably coupled to the controller 340 and used to determine how far each pin 332 has extended.

The controller 340 may be operably coupled to the valves in each of the hydraulic pin systems 330. The controller 340 may be configured to store a pre-programmed file describing the required extension distance of each pin 332 of the variable mold 300 in order to create a desired shape. The controller 340 may be configured to monitor a position of each pin via pin position detector 350 and close the corresponding valve when the pin 332 has extended a predetermined distance. In an exemplary embodiment, the controller 340 may close a corresponding valve by sending a current through the wire coil 170 of the MR fluid valve 100 (see FIG. 2, for example).

Figure 12:
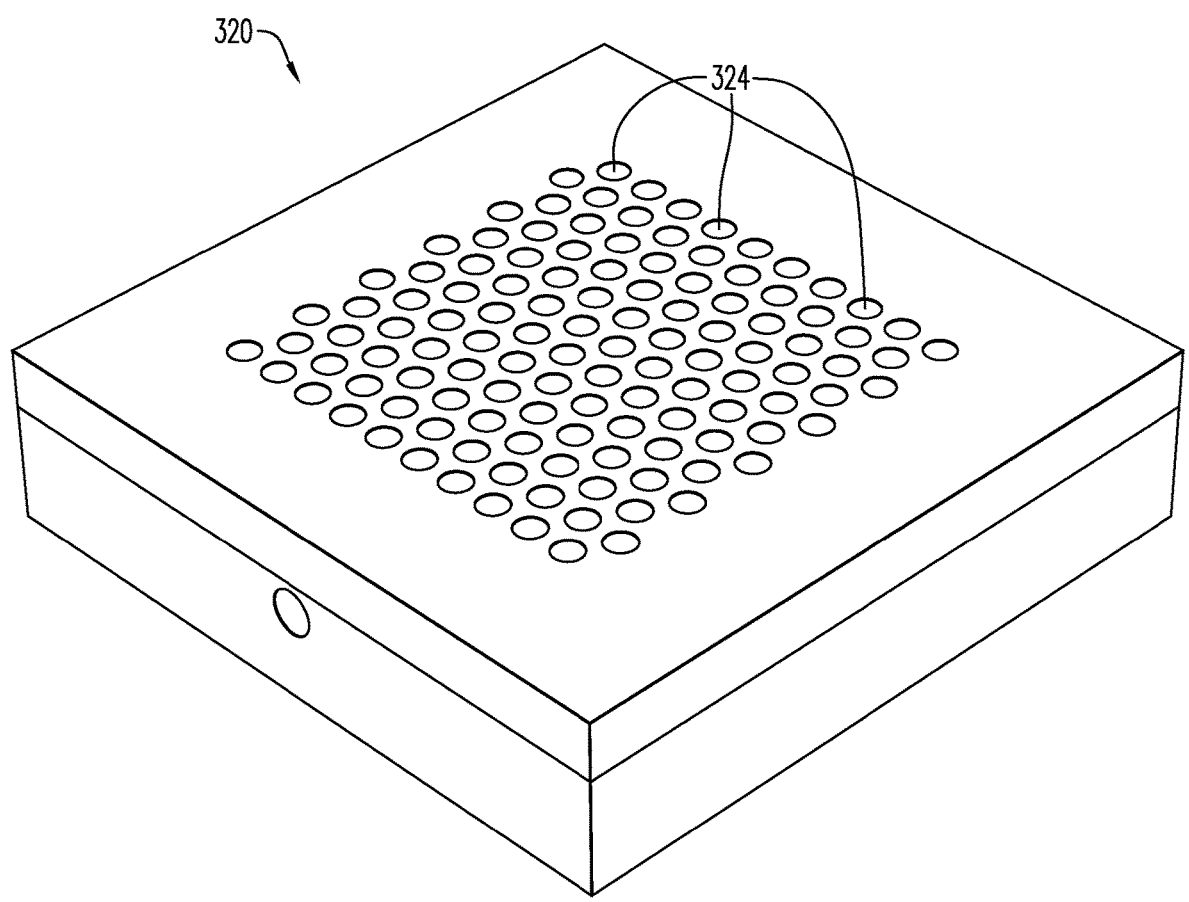
FIG. 12 is a perspective view of a manifold according to an exemplary embodiment.

FIG. 12 shows an exemplary embodiment of the manifold 320. The manifold 320 may include an inlet port 322 for fluid communication with the pump 310 (see FIG. 11). The manifold may further include a plurality of outlet ports 324 for fluid communication with each of the hydraulic pin assemblies 330 (see FIG. 11).

Figure 13:
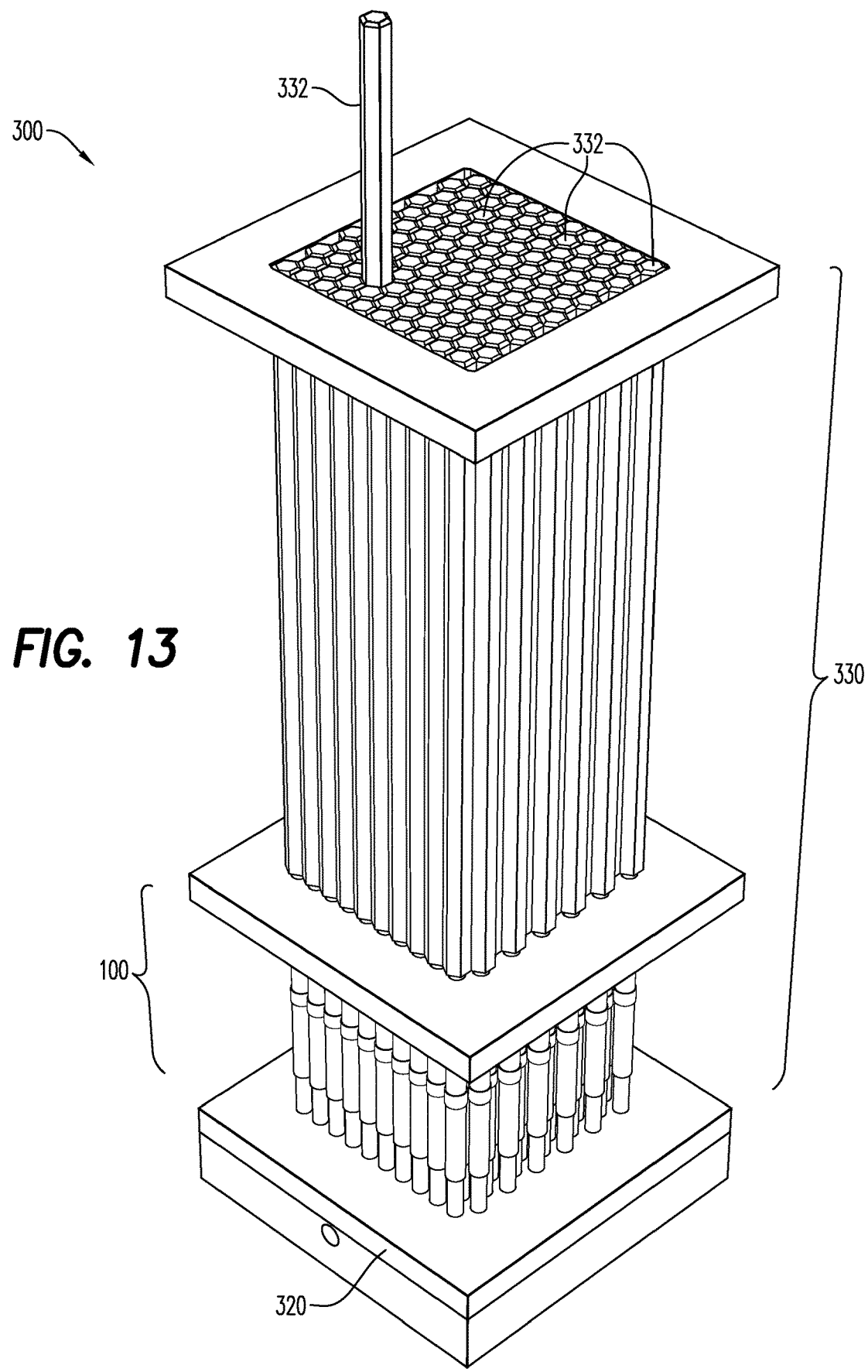
FIG. 13 is a perspective view of a variable mold according to an exemplary embodiment.
Figure 14:
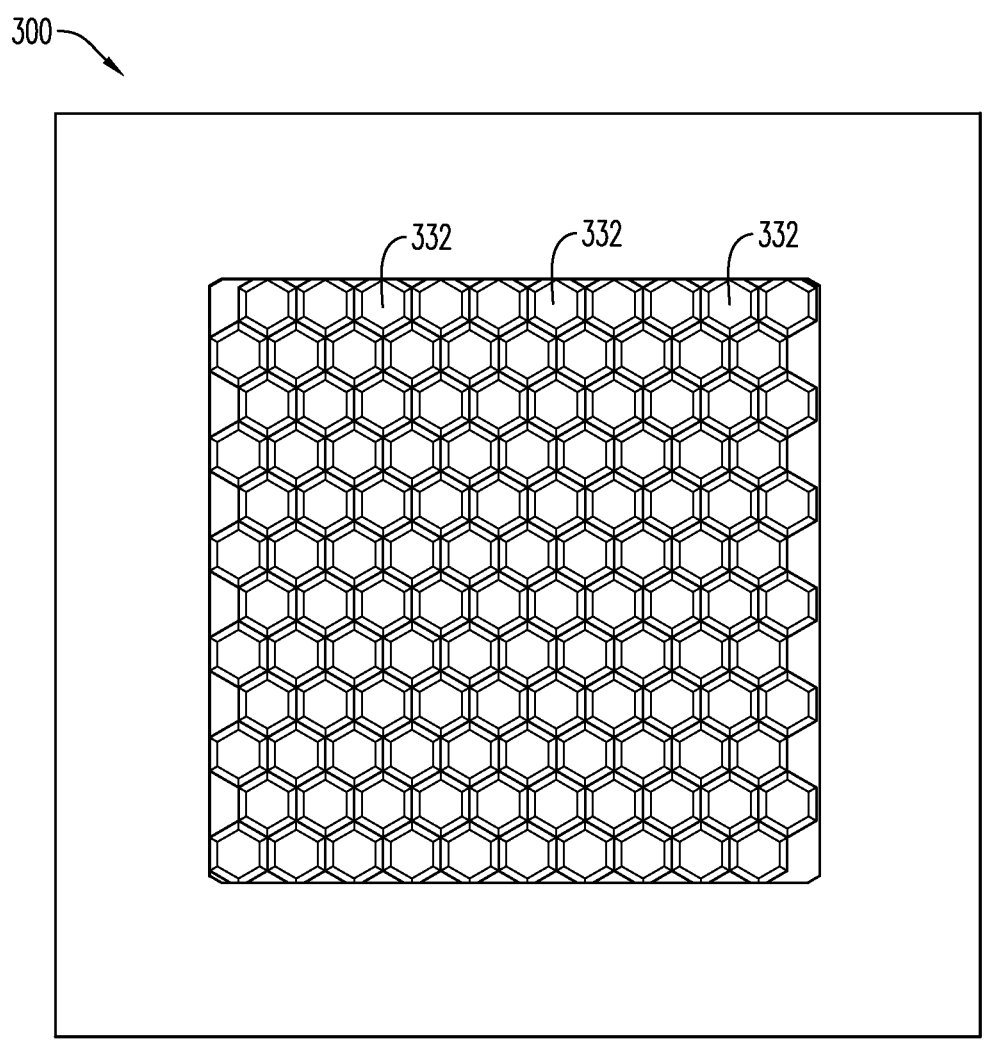
FIG. 14 is a top plan view of a variable mold according to an exemplary embodiment.

FIG. 13 shows an exemplary view of the variable mold 300. In an exemplary embodiment, each of the pins 332 may have a hexagonal shape (see also, FIG. 14) and may be arranged in a honeycomb pattern to as to minimize space between each of the pins 332. While the exemplary embodiment shown in FIG. 13 shows 120 pins 332, it will be understood the embodiment of FIG. 13 is exemplary only and that the variable mold 300 is not limited to this configuration. It is envisioned that the variable mold may be configurable up to any desired size, including tens of thousands, hundreds of thousands, or more of pins 332.

In an exemplary embodiment, magnetic shielding may be provided around each magnetic coil 170 of the magnetic pin assemblies 330. The magnetic shielding may be configured so as to prevent the magnetic field generated by a first magnetic coil 170 from interfering with the MR fluid in an adjacent or otherwise nearby hydraulic pin assembly 330. In an exemplary embodiment, the magnetic shielding may be formed of a high permeability material such as iron. In an exemplary embodiment, the magnetic shielding may be a metallic sleeve that fits around the MR fluid valve 100.

Additionally, in an exemplary embodiment, heat shielding and/or thermal insulation may be provided around each magnetic coil 170. The heat shielding may be configured to stop thermal transfer of heat caused by ohmic heating from an activated magnetic coil.

In an exemplary embodiment, a cooling system may be provided around the MR fluid valves 100. The cooling system may help to counter heat generated from the magnetic coils via ohmic heating so as allow for higher current and magnetic density. In an exemplary embodiment, the cooling system may include a fluid-tight chamber in which the MR fluid valves are disposed, and actively pumping a cooling fluid through the fluid-tight chamber. In an alternative exemplary embodiment, a passive convection cooling system may be used.

At least an exemplary embodiment described herein describes the use of an MR fluid. It will be understood that for the purposes of this description, an MR fluid is a fluid in which the apparent viscosity increases when subjected to a magnetic field. In an exemplary embodiment, the MR fluid may become a viscoelastic solid when subjected to a magnetic field. In an exemplary embodiment, the MR fluid may be MRF-140BC Magneto-Rheological Fluid manufactured by Lord Corporation; MRF-140CG Magneto-Rheological Fluid manufactured by Lord Corporation; or a Gallium-based liquid metal. However, it will be understood that these examples are exemplary only and not limiting, and that other MR fluids may also be used with the structure described herein.

In an exemplary embodiment in which a Gallium-based MR (GMR) fluid is used, a temperature of the fluid system (i.e., fluid reservoir, the manifold 320, the MR fluid valves 100, fluid supply lines) may be increased above the melting point of the GMR fluid. The controller 340 (see FIG. 11) may then control the pump to flow the GMR fluid through the manifold into the MR fluid valves 100 so as to extend the pins 332. The controller 340 may selectively control the MR fluid valves 100 to stop flow of the GMR fluid as individual pins 332 reach their predetermined extension distance. Once all pins 332 are in the desired position, a coolant system may be used to lower the temperature surrounding the MR fluid valves 100 to a point below the melting point of the GMR fluid, thereby solidifying the GMR within the MR fluid valves 100. The magnetic coils 170 may then be turned off, and the MR fluid valves 100 will remain in a closed position due to the solidified GMR fluid. To reset the pins 332, the coolant system may be controlled to raise the temperature surrounding the MR fluid valves 100 above the GMR fluid melting point, and the GMR fluid may be pumped out of the hydraulic pin assemblies 330 by applying a negative pressure. The use of the GMR fluid and controlling the temperature via the cooling system may allow for the variable mold 300 to be used in environments with autoclave pressure (i.e., 100 psi or more). This would allow the variable mold 300 to be used in fabrication of parts for aerospace applications, for example.

Figure 15:
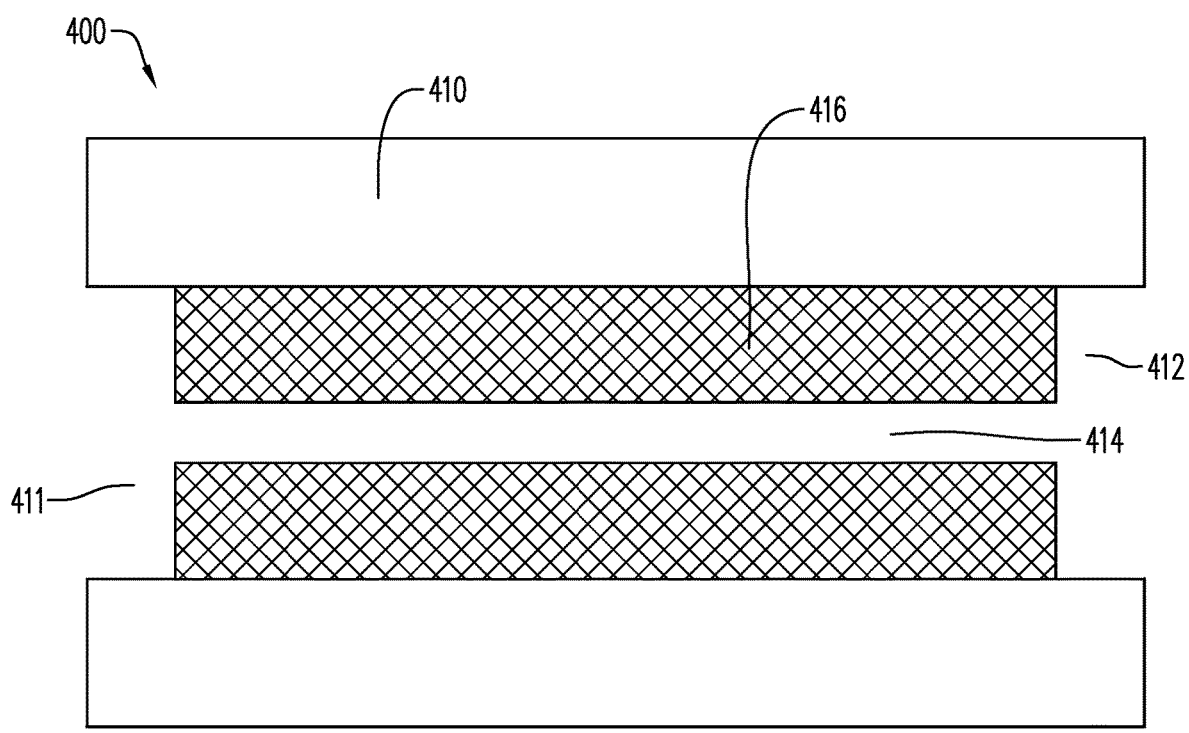
FIG. 15 is a side view of a MR fluid valve according to an exemplary embodiment.

FIG. 15 shows an exemplary embodiment of an MR fluid valve 400. The MR fluid valve 400 may be as an alternative to the MR fluid valve 100. The MR fluid valve 400 may include a hollow cylinder 410. An interior of the hollow cylinder 410 may be divided into a first large diameter portion 411, a small diameter portion 414, and a second large diameter portion 412. A magnetic coil 416 may be provided around the small diameter portion 414. When the magnetic coil 416 is powered, the resulting magnetic field may increase the viscosity of the MR fluid within the small diameter portion 414, thereby turning the MR fluid into a viscoelastic fluid and stopping flow of the MR fluid through the small diameter portion 414.

Figure 16:
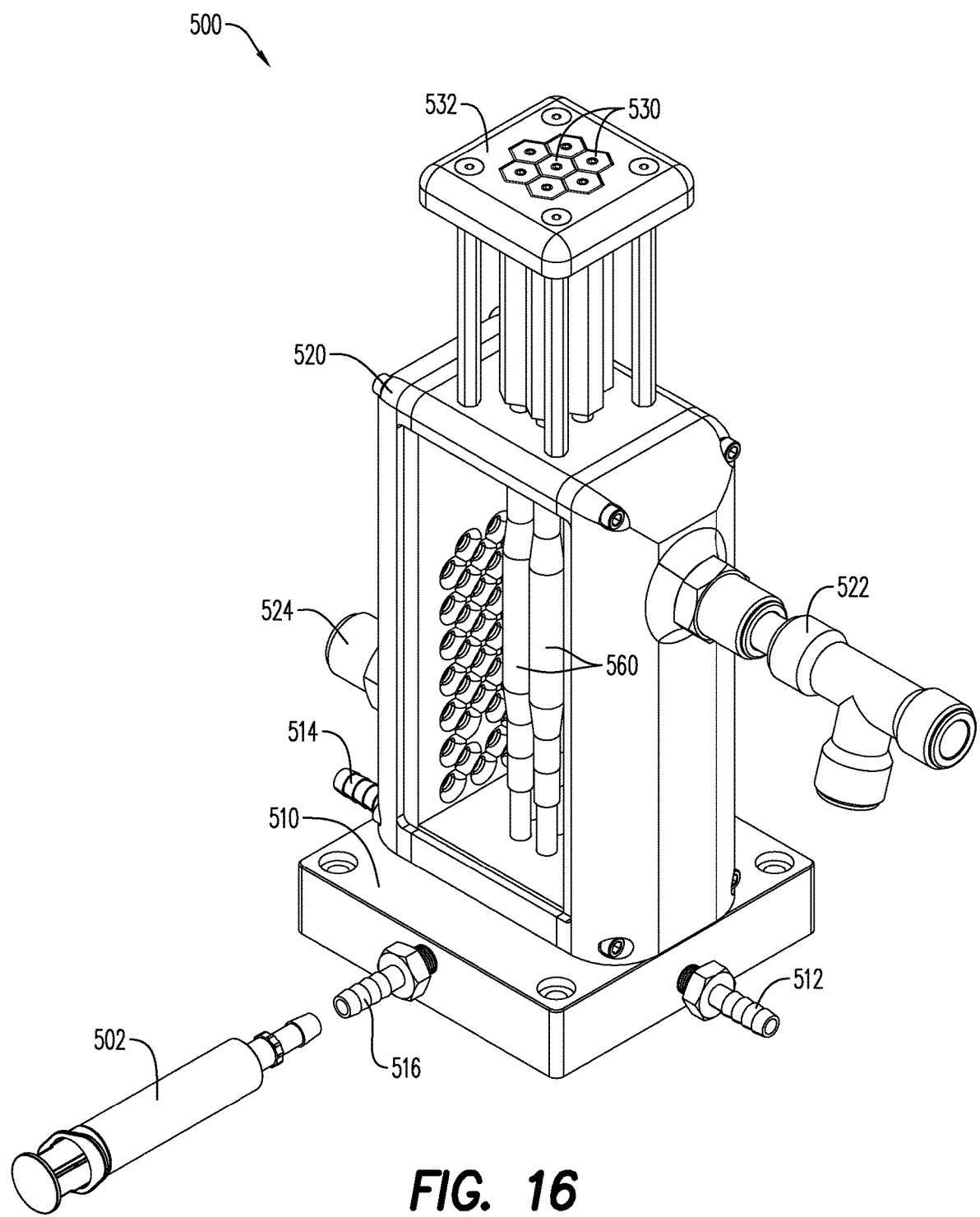
FIG. 16 is a perspective view of a variable mold according to an exemplary embodiment.
Figure 17:
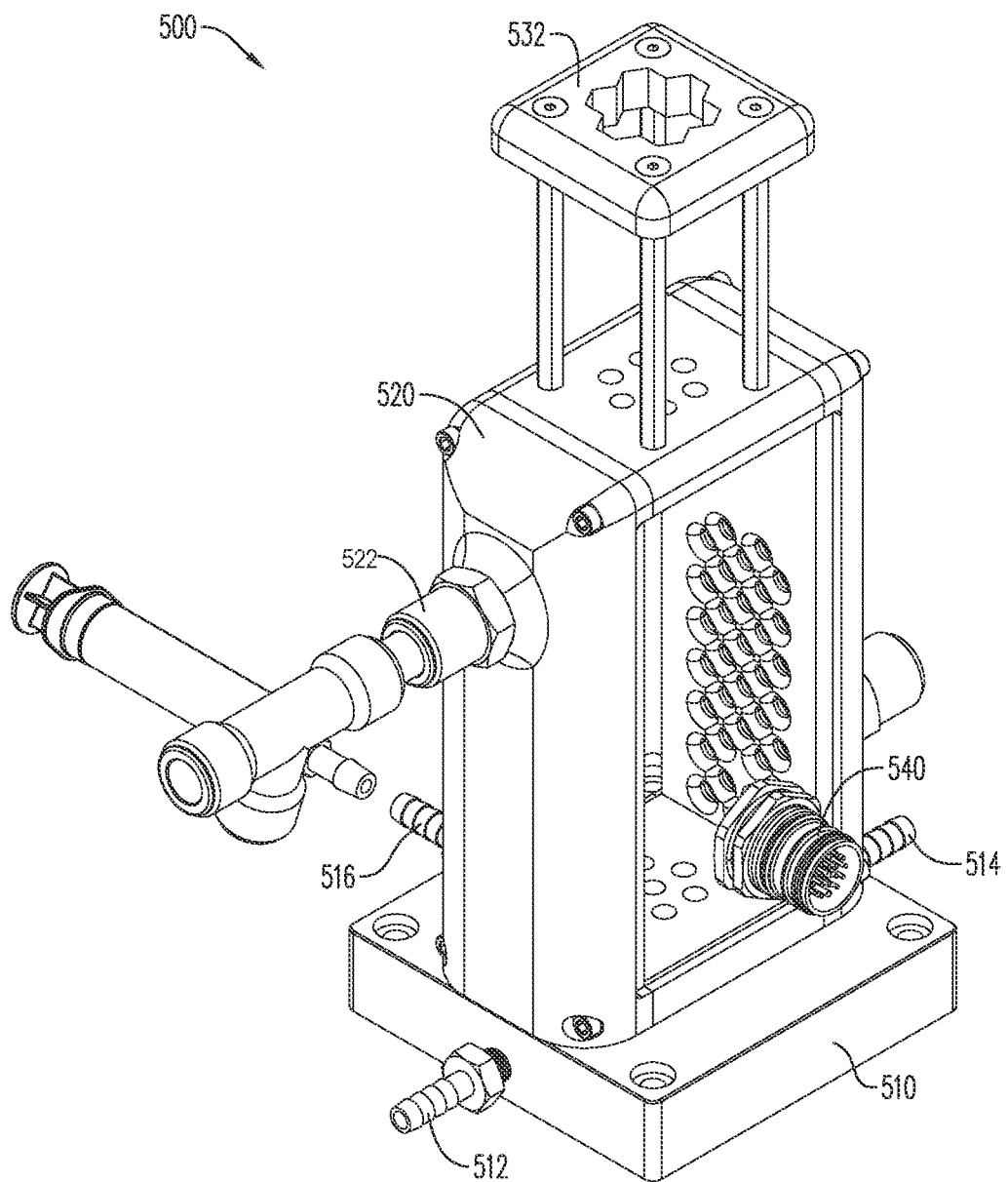
FIG. 17 is a perspective view of a variable mold according to an exemplary embodiment.

FIGS. 16-17 shows an exemplary embodiment of a scale model variable mold 500 for demonstrating the principles of operation. A syringe 502 may be used to model a pump for supplying the MR fluid. The syringe may supply the MR fluid to a manifold 510 via a fluid inlet 516. While under pressure from the syringe 502, the MR fluid may flow through MR fluid valves 560 provided in a chamber 520. Each individual MR fluid valve 560 may be controlled via a control signal transmitted via a control line (not shown) from a control coupling 540 (see FIG. 17). An external cable (not shown) may operably couple the control coupling to a controller. From the control valves 560, the MR fluid may extend pins 530. A frame 532 may be provided to provide mechanical support for the pins 530 as they extend.

As further seen in FIGS. 16-17, the variable mold 500 may include a manifold temperature fluid inlet 512 and a manifold temperature fluid outlet 514, which are used to circulate a temperature control fluid through the manifold 510. The temperature control fluid may be used to transition states of a GMR fluid as described above. Further, the variable mold may include a chamber temperature fluid inlet 522 and a chamber temperature fluid outlet 524 (FIG. 16), which may be used to circulate the temperature control fluid through the chamber 520.

Figure 18:
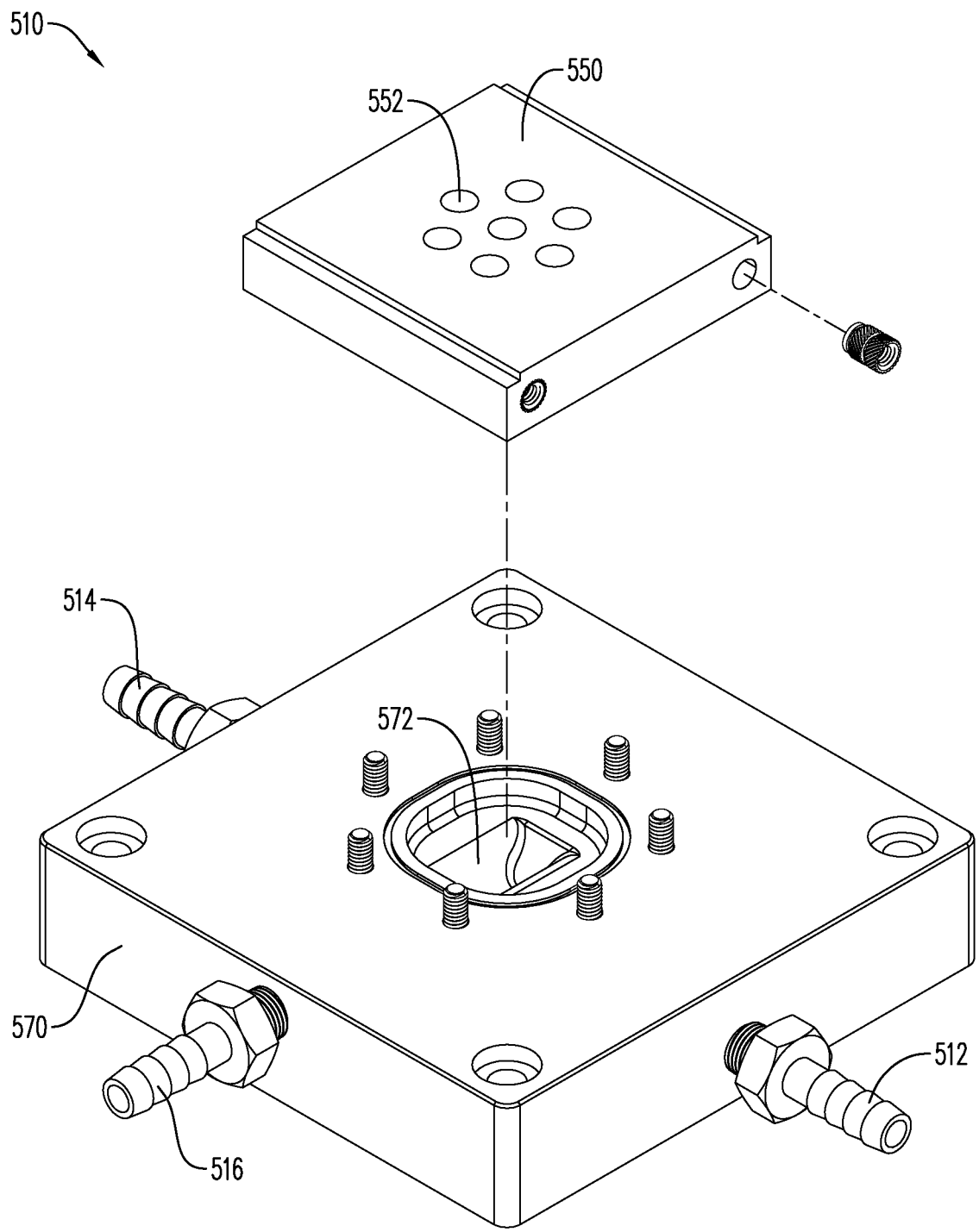
FIG. 18 is an exploded perspective view of manifold according to an exemplary embodiment.

FIG. 18 shows an exemplary embodiment of a manifold 510. The manifold 510 may include a manifold base plate 570 and a fluid flow divider 550. The MR fluid supplied to the manifold via fluid inlet 516 will flow to an interior flow path 572. The MR fluid will then pass through each of a plurality of valve fluid inlets 550 provided in the fluid flow divider. Each of the valve fluid inlets 550 may be in fluid communication with one of the MR fluid valves 560 (see FIGS. 16-17).

FIGS. 19-31 show various charts and diagrams illustrating Finite Element Method Magnetics (FEMM) data for a model of a single MR fluid valve 100 using various thickness of magnetic shielding. The data was prepared assuming a current of 2 amps DC through the magnetic coil 170. The magnetic coil 170 included 376 coil turns for the purposes of the FEMM data. The MR fluid considered in generating the FEMM data was MRF-140CG manufacturing by Lord Corporation.

Figure 19:
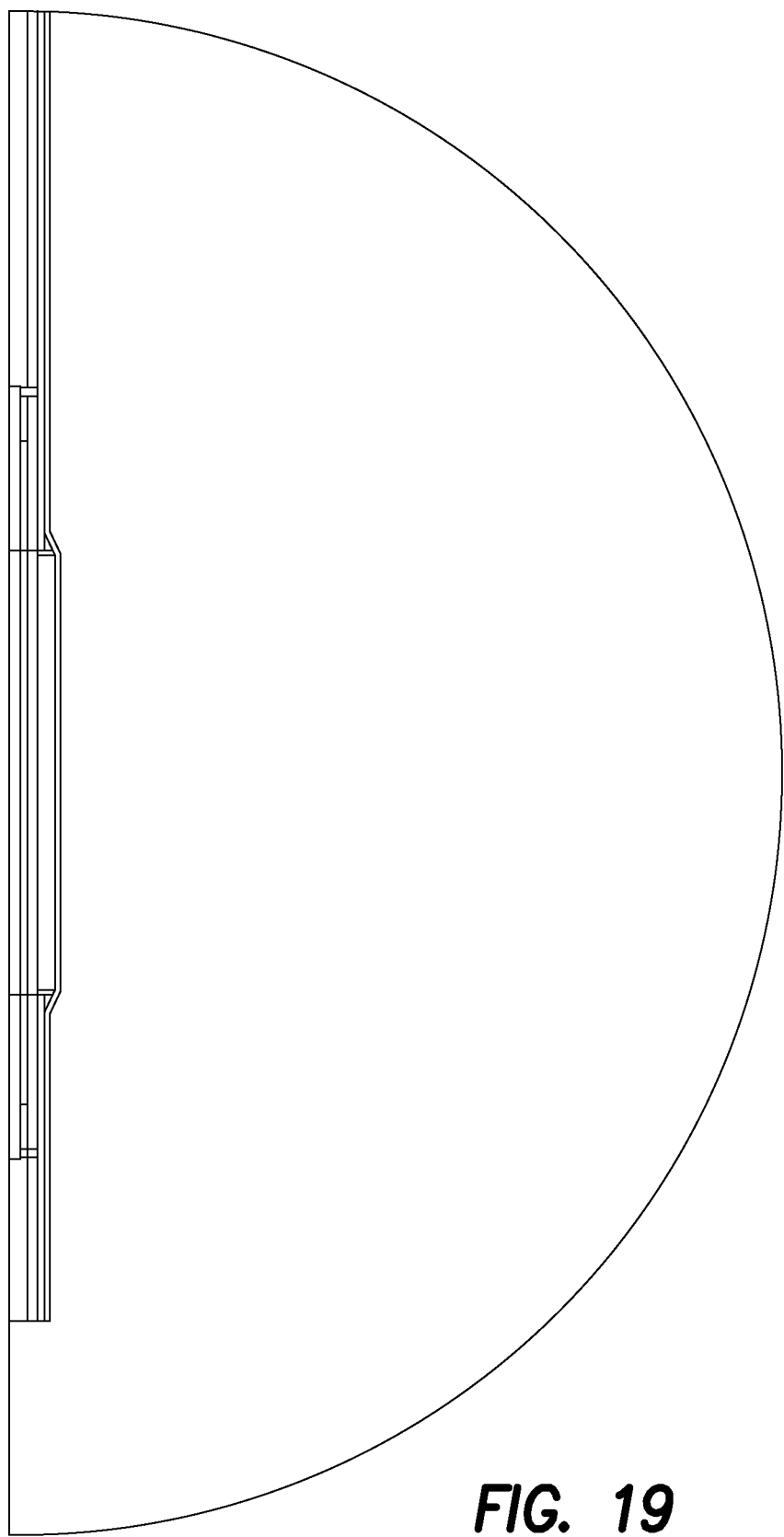
FIG. 19 is a diagram showing an analysis layout for generation of Finite Element Method Magnetics (FEMM) data.
Figure 20:
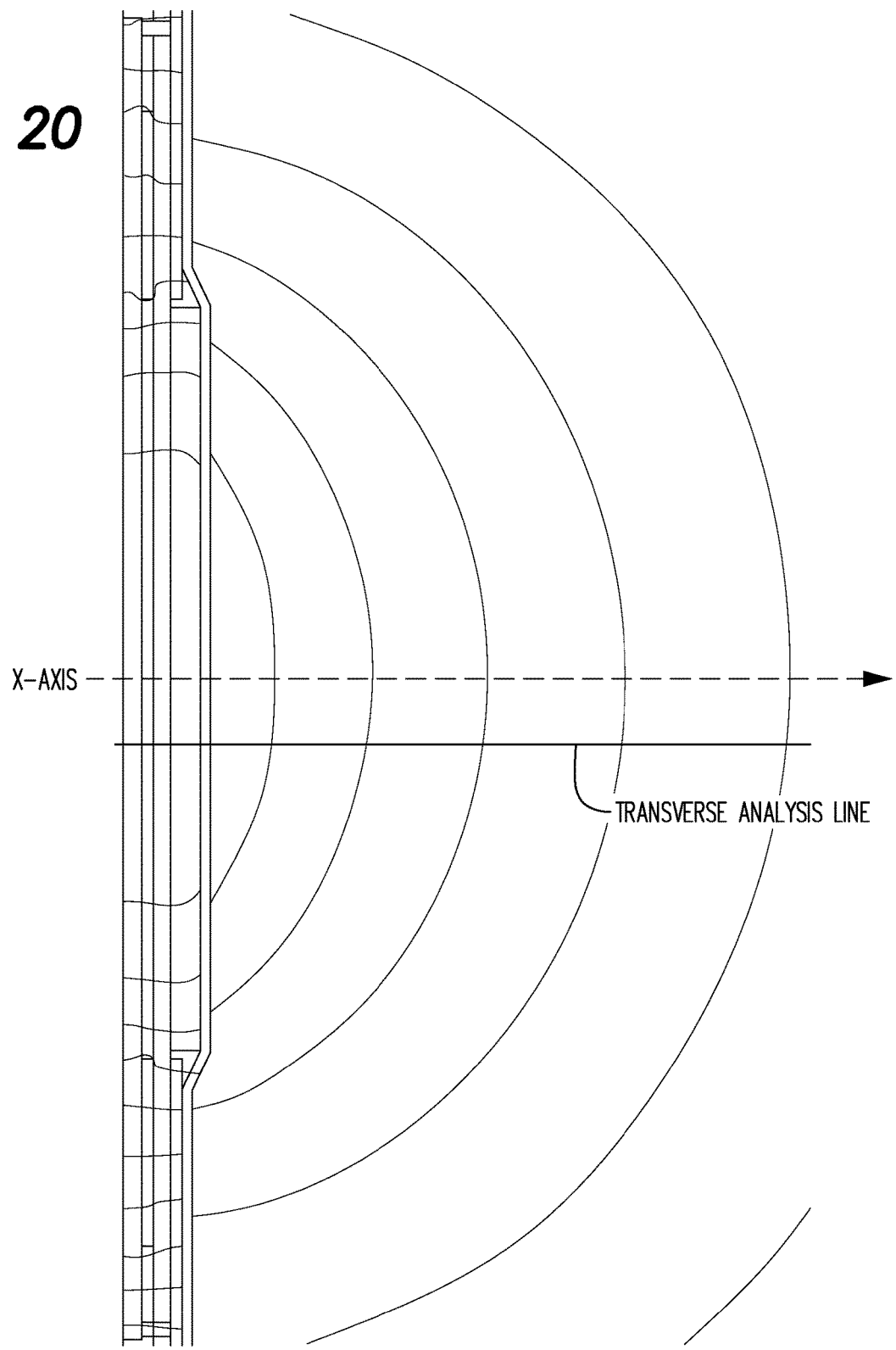
FIG. 20 is a diagram showing a transverse analysis line for generation of FEMM data.
Figure 21:
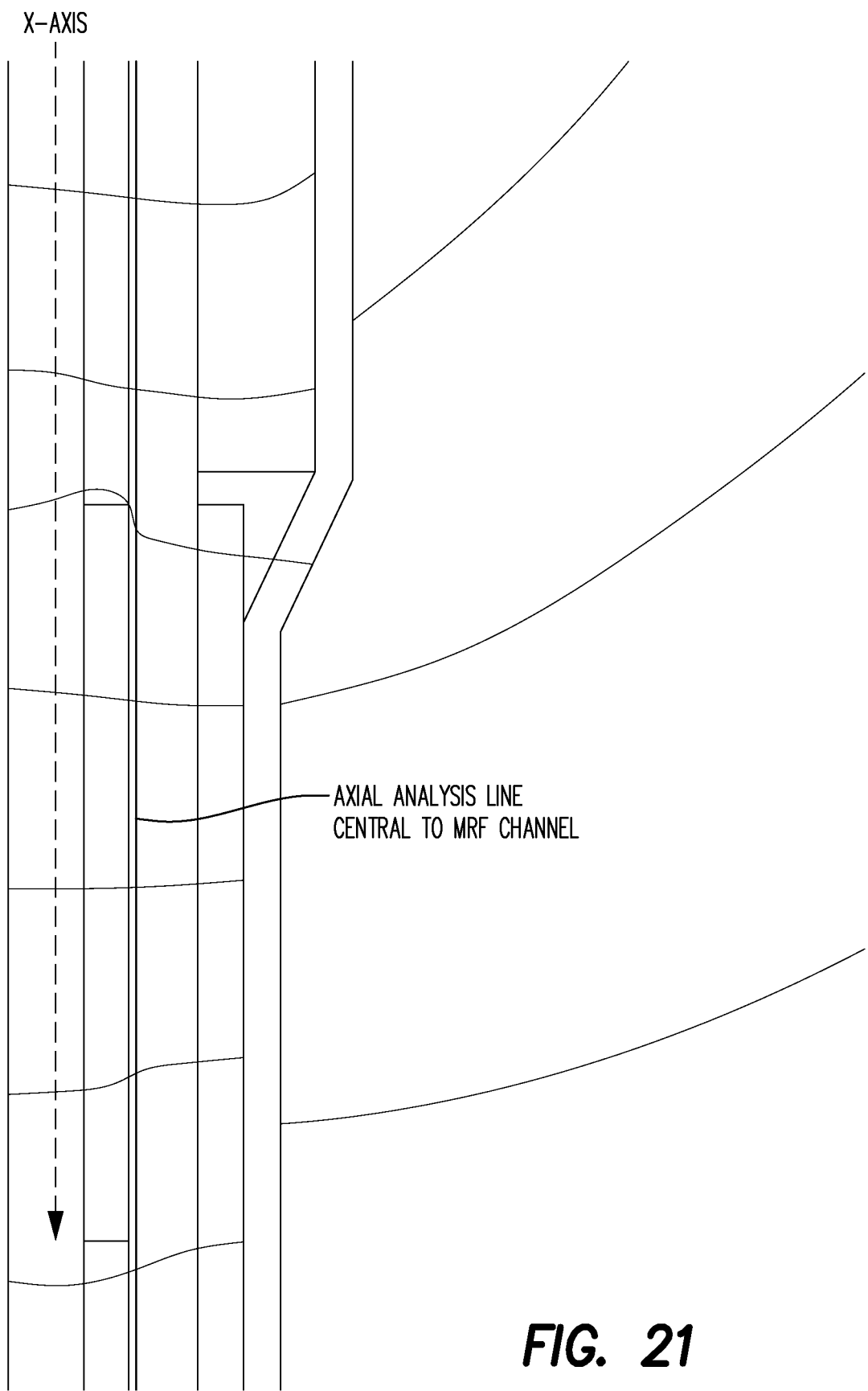
FIG. 21 is a diagram showing an axial analysis line for generation of FEMM data.

FIG. 19 shows a summary of the analysis layout of the MR fluid valve used to generate the FEMM data. FIG. 20 illustrates the x-axis for plots indicating magnetic field strength measured along a transverse analysis line. FIG. 21 illustrates the x-axis for plots indicating magnetic field strength measured along an axial analysis line central to the MR fluid channel.

Figure 22:
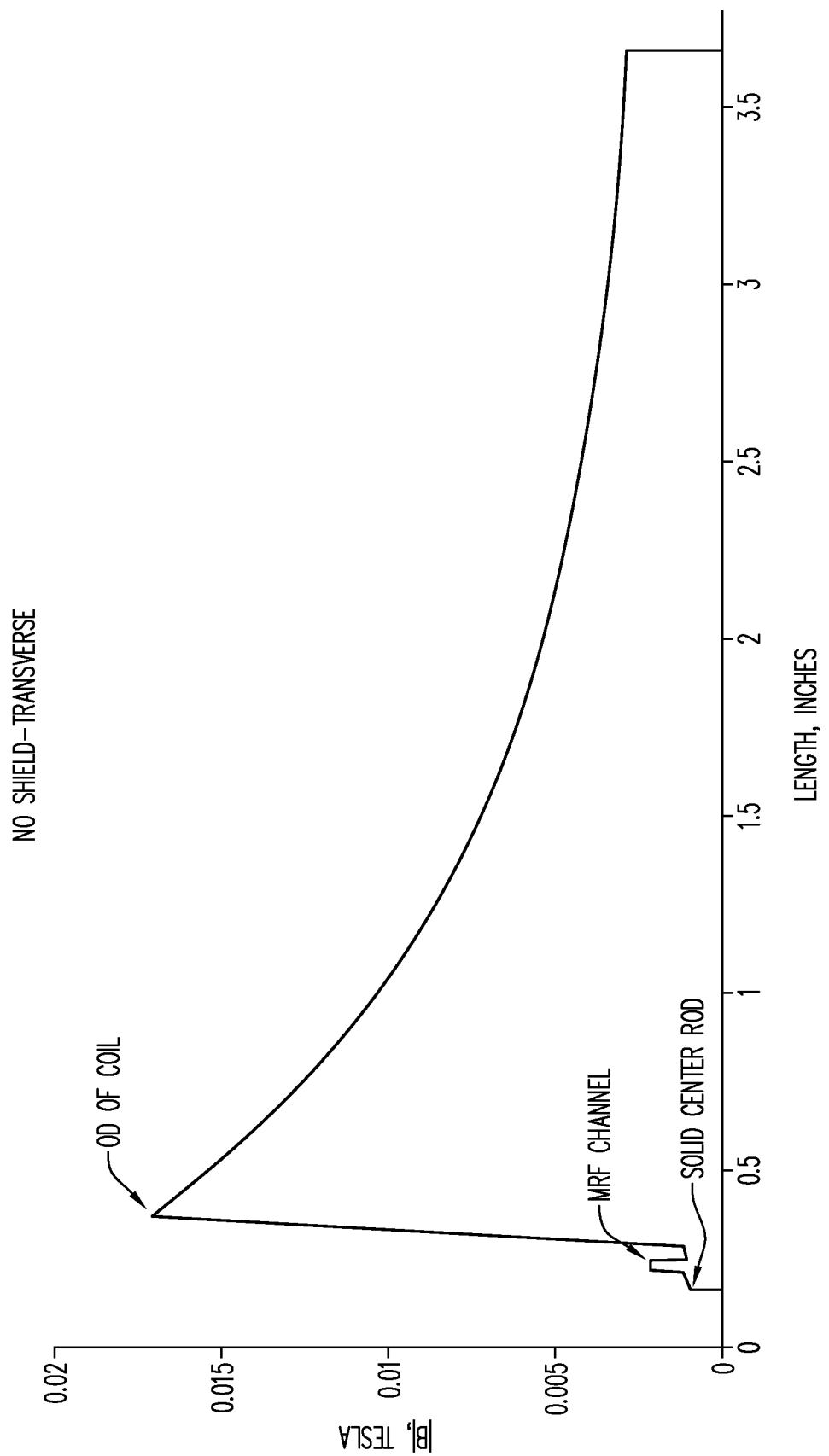
FIG. 22 is a plot showing magnetic field strength along a transverse analysis line with no magnetic shielding.
Figure 23:
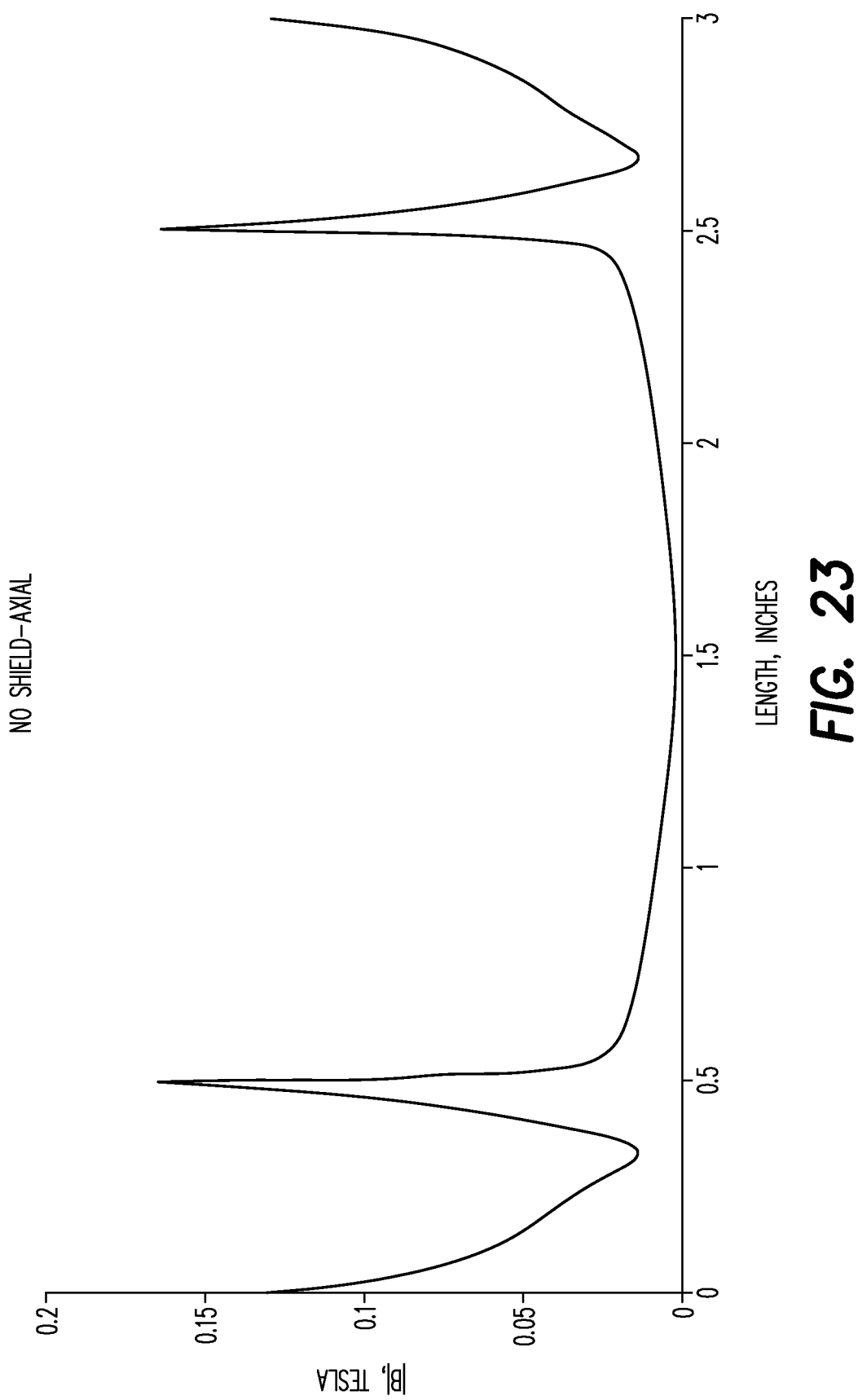
FIG. 23 is a plot showing magnetic field strength along an axial analysis line with no magnetic shielding.
Figure 24:
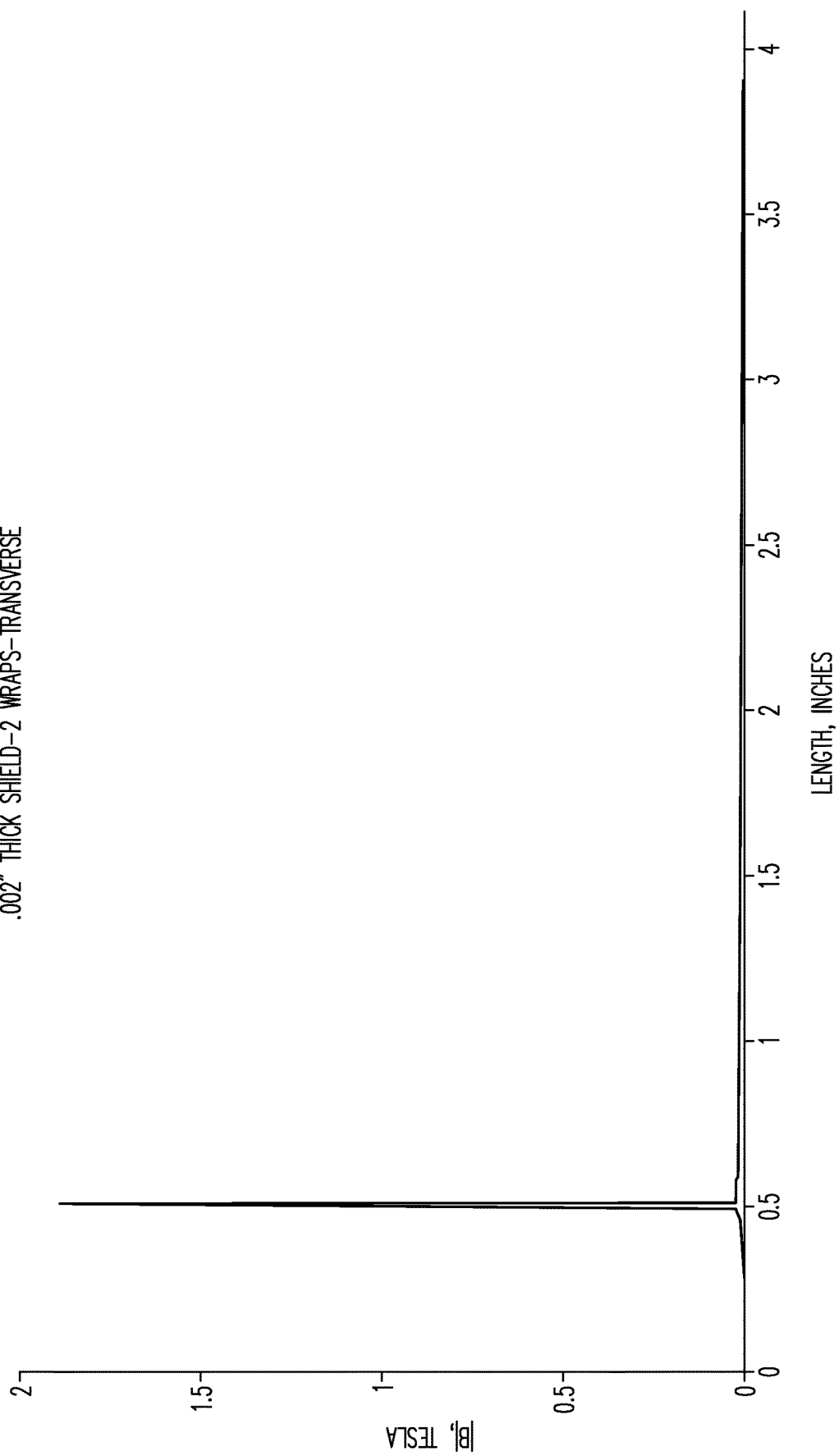
FIG. 24 is a plot showing magnetic field strength along a transverse analysis line with 0.002 inches of magnetic shielding.
Figure 25:
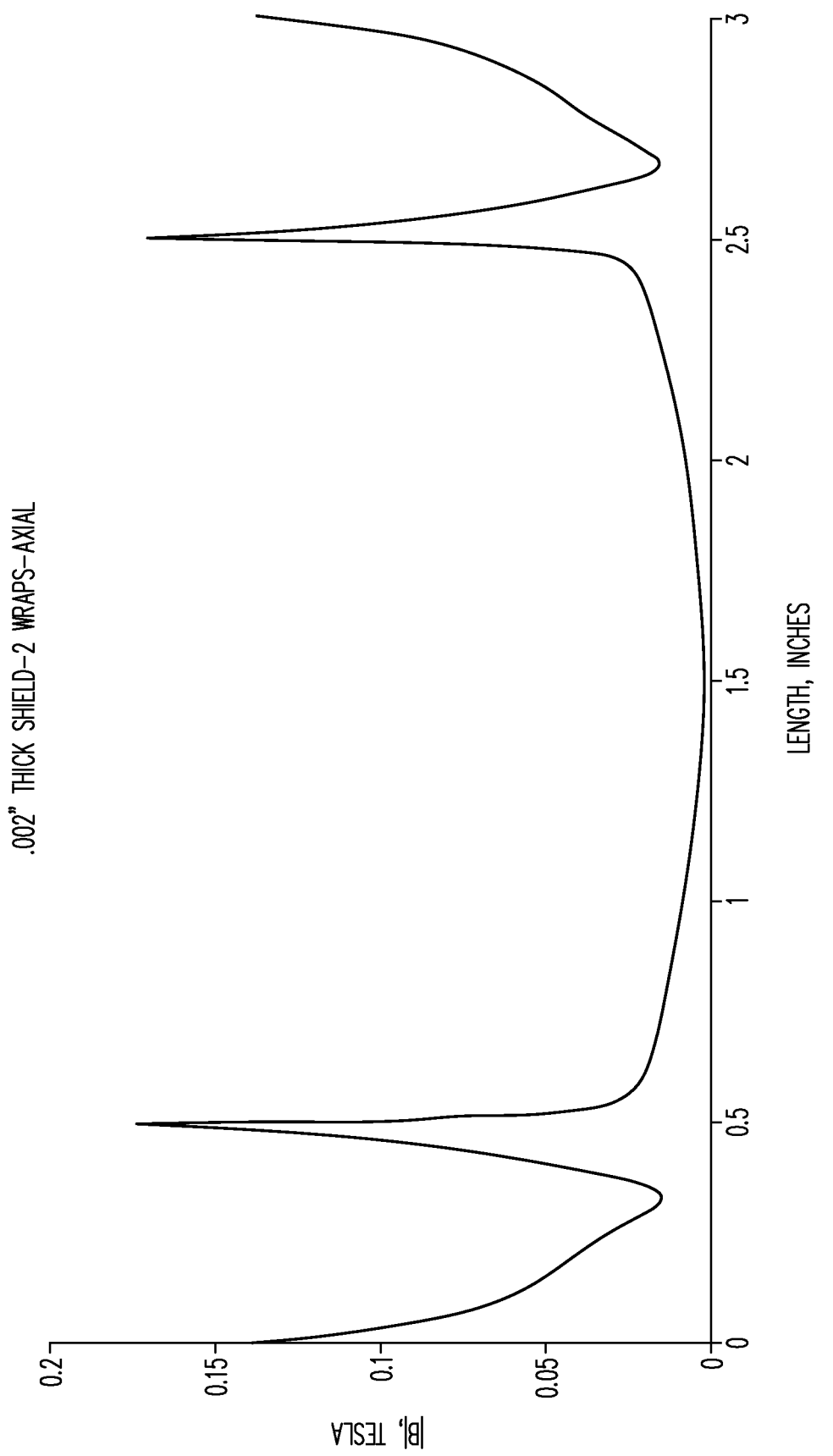
FIG. 25 is a plot showing magnetic field strength along an axial analysis line with 0.002 inches of magnetic shielding.
Figure 26:
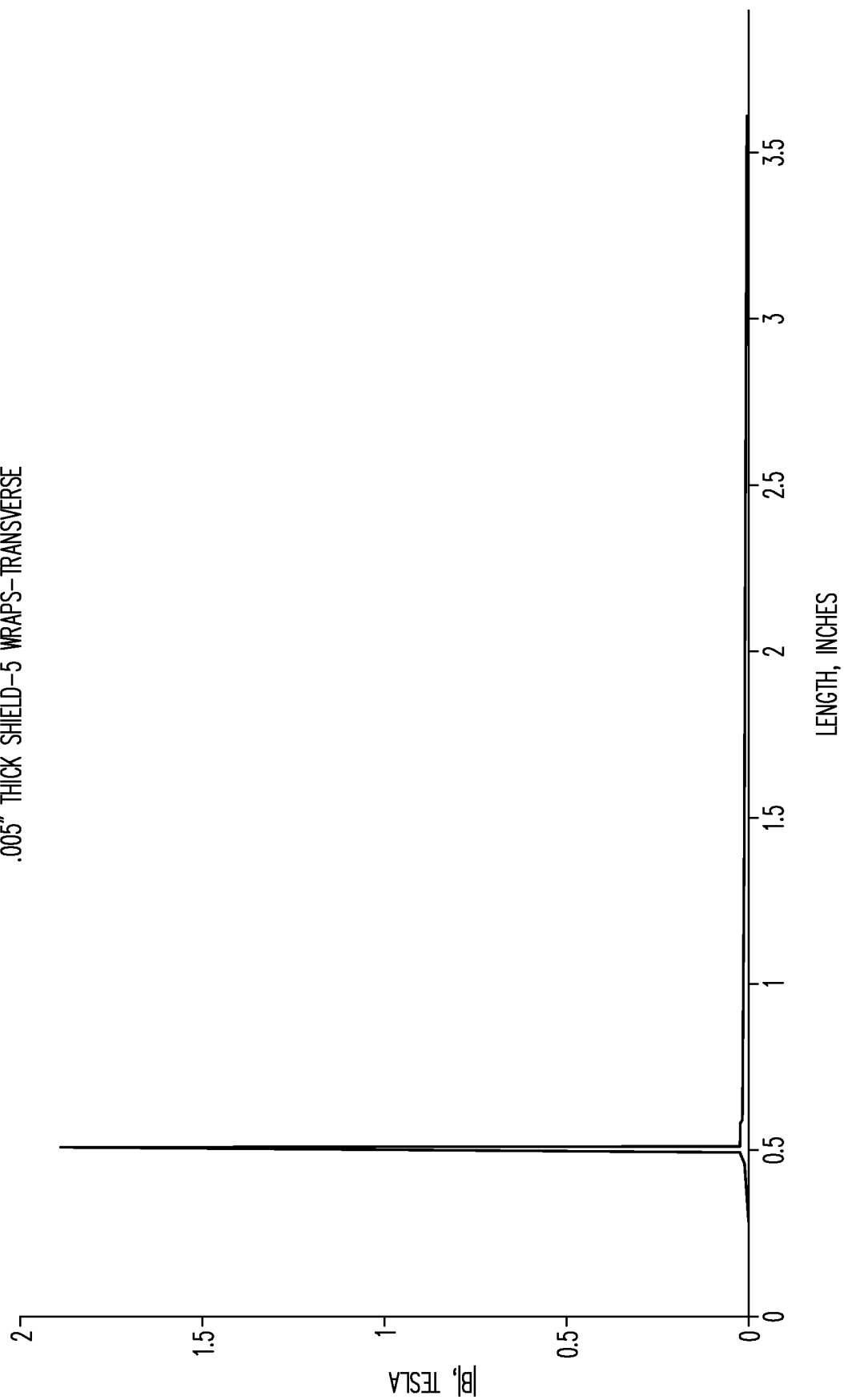
FIG. 26 is a plot showing magnetic field strength along a transverse analysis line with 0.005 inches of magnetic shielding.
Figure 27:
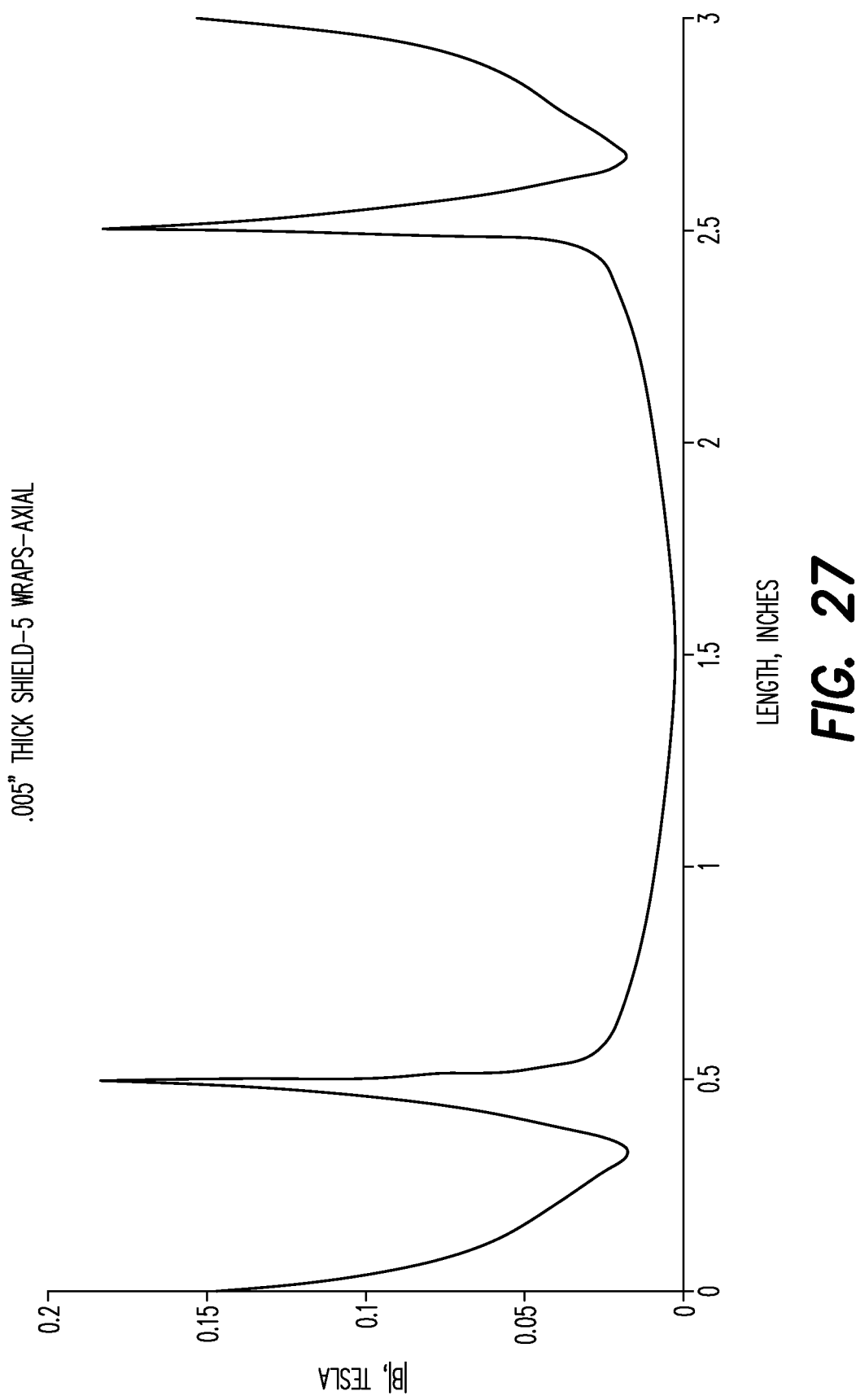
FIG. 27 is a plot showing magnetic field strength along an axial analysis line with 0.005 inches of magnetic shielding.
Figure 28:
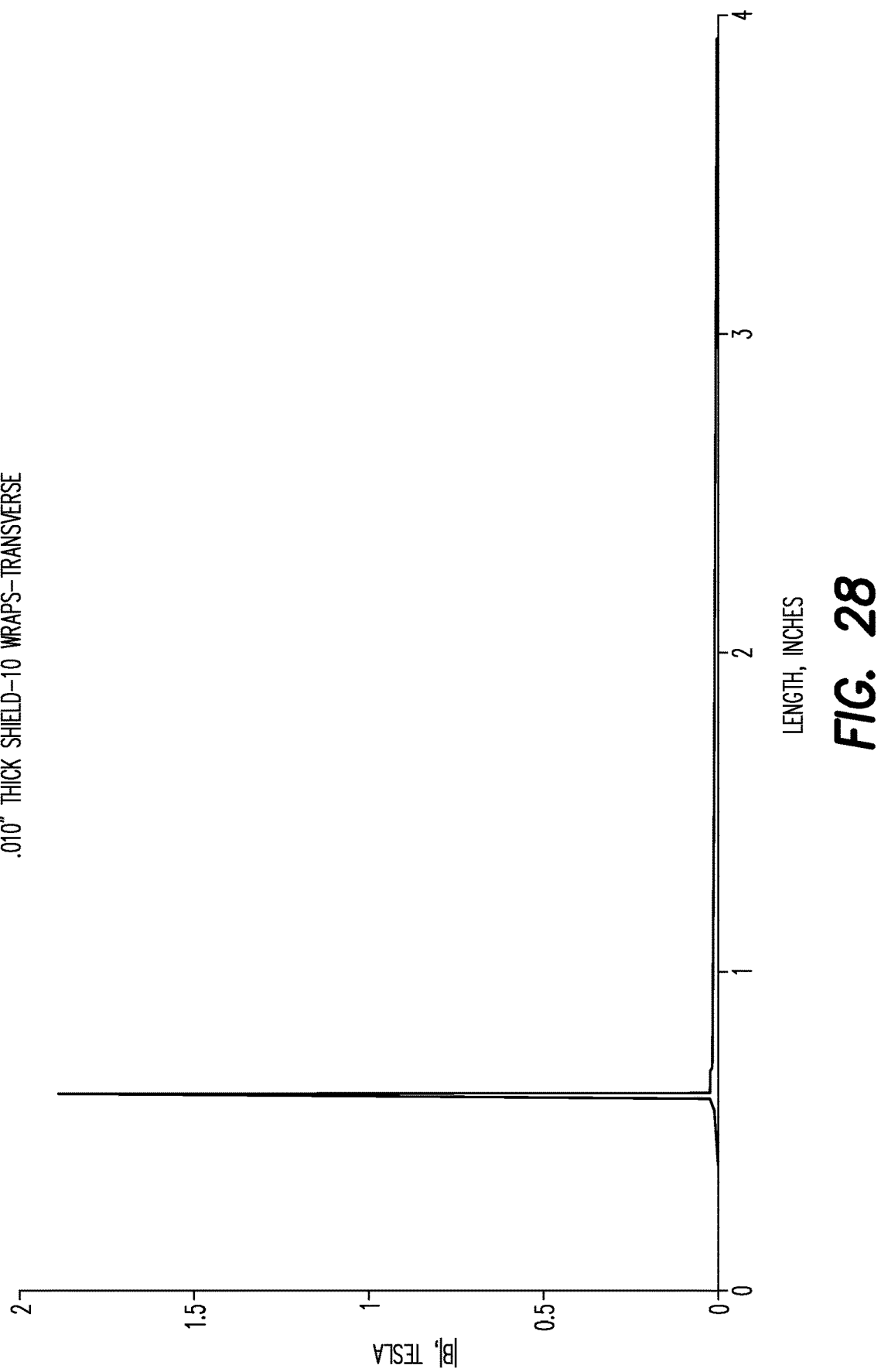
FIG. 28 is a plot showing magnetic field strength along a transverse analysis line with 0.010 inches of magnetic shielding.
Figure 29:
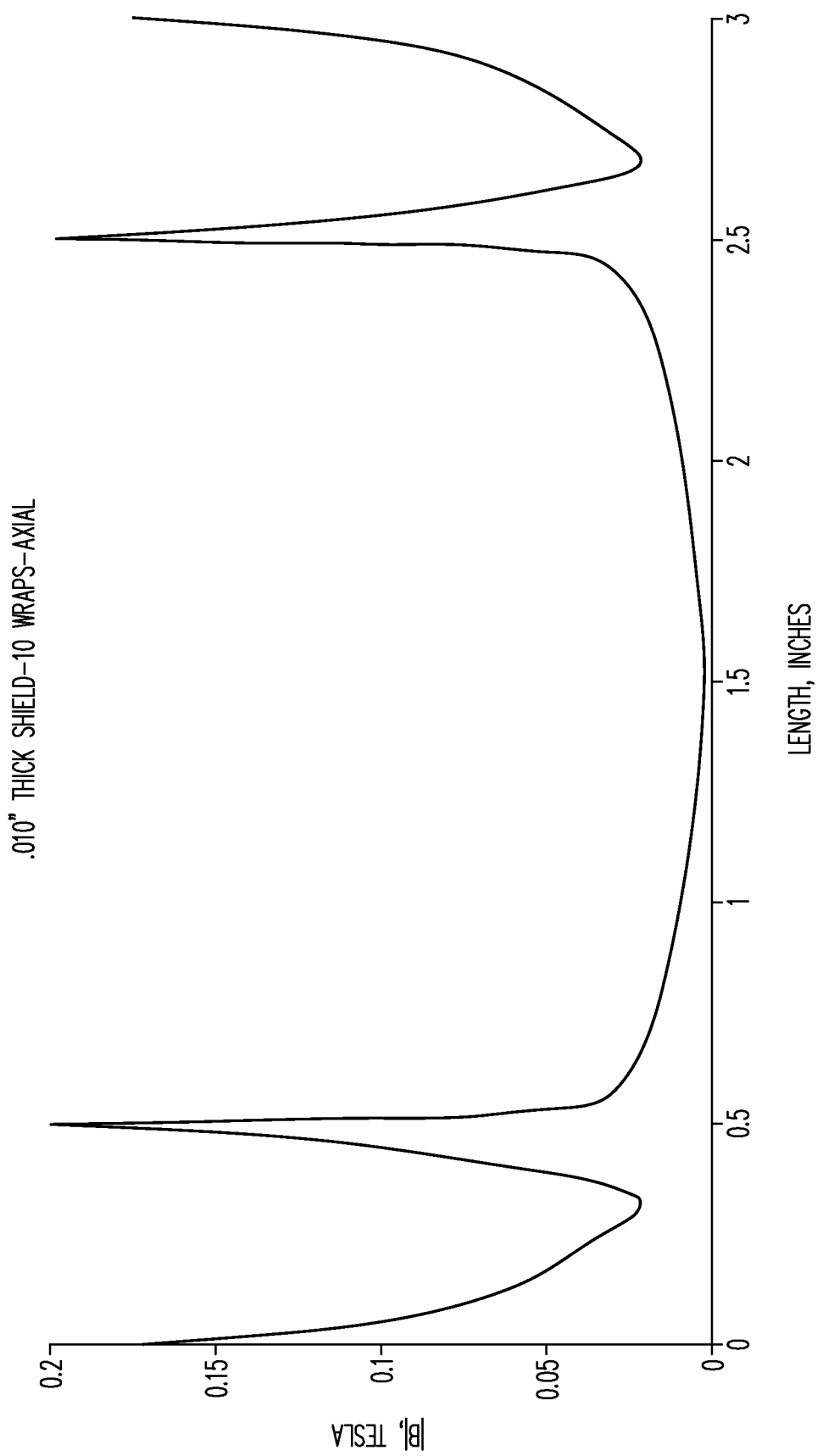
FIG. 29 is a plot showing magnetic field strength along an axial analysis line with 0.010 inches of magnetic shielding.
Figure 30:
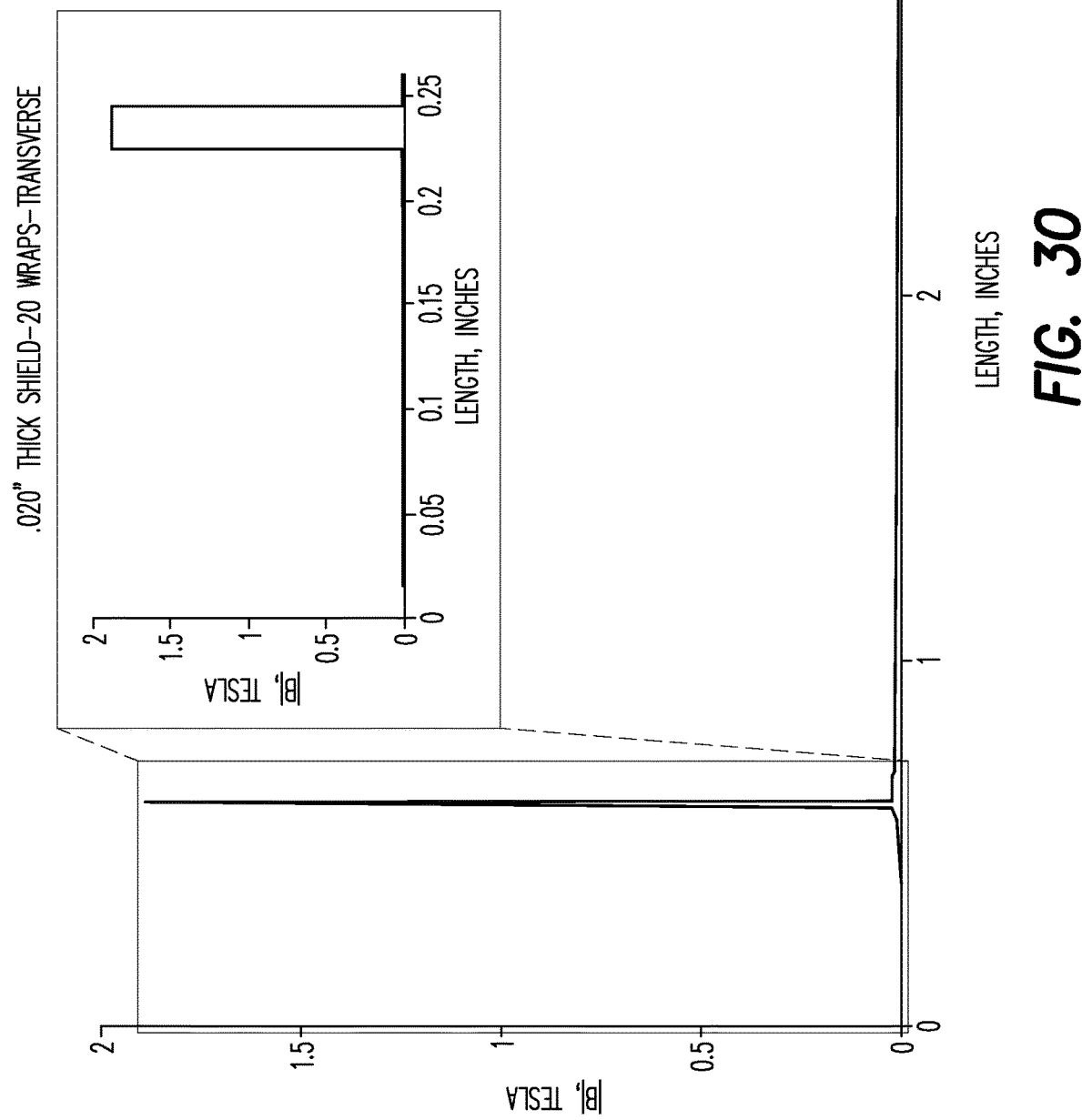
FIG. 30 is a plot showing magnetic field strength along a transverse analysis line with 0.020 inches of magnetic shielding.
Figure 31:
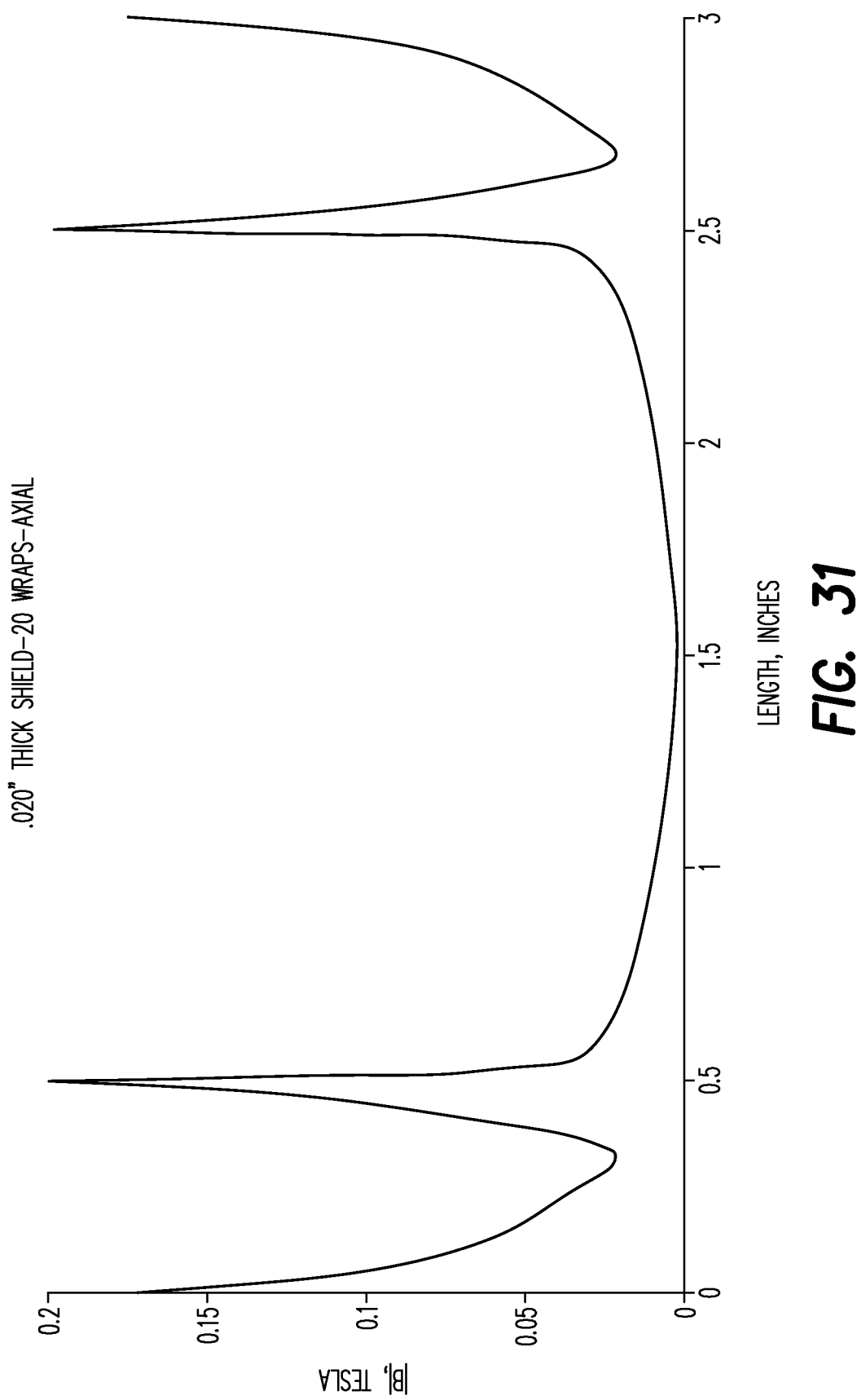
FIG. 31 is a plot showing magnetic field strength along an axial analysis line with 0.020 inches of magnetic shielding.

FIGS. 22-23 show magnetic field strength for an MR fluid valve having no magnetic shielding. As seen in FIG. 22, there is significant magnetic field extending well beyond the geometry of the MR fluid valve, which could cause interference with the operation of adjacent MR fluid valves in a full variable mold assembly.

FIGS. 24-31 illustrate plots of magnetic field strength for varying thicknesses of magnetic shielding, ranging from 0.002 inches thick to 0.02 inches thick. As seen in FIG. 24, FIG. 26, FIG. 28, FIG. 30, the magnetic shielding significantly reduces the strength of the magnetic field outside of the geometry of the MR fluid valve. This would allow adjacent MR fluid valves to operate independently without interference from each other.

This disclosure, in various embodiments, configurations and aspects, includes components, methods, processes, systems, and/or apparatuses as depicted and described herein, including various embodiments, sub-combinations, and subsets thereof. This disclosure contemplates, in various embodiments, configurations and aspects, the actual or optional use or inclusion of, e.g., components or processes as may be well-known or understood in the art and consistent with this disclosure though not depicted and/or described herein.

Embodiments of the disclosure are operational with numerous other general purpose or special purpose computing system environments or configurations. Examples of computing systems, environments, and/or configurations that may be suitable for use with the systems and methods described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The embodiments of the disclosure may be described in the general context of computer-executable instructions, such as program modules, being executed by a computer.

Generally, program modules may include routines, programs, objects, components, data structures, etc. that perform particular tasks or implement particular abstract data types. The systems and methods described herein may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the exemplary embodiments as processor executable instructions, which can be written on any form of a computer readable media in a corresponding computing environment according to this disclosure.

The phrases "at least one," "one or more," and "and/or" are open-ended expressions that are both conjunctive and disjunctive in operation. For example, each of the expressions "at least one of A, B and C;" "at least one of A, B, or C;" "one or more of A, B, and C;" "one or more of A, B, or C;" and "A, B, and/or C" means A alone; B alone; C alone; A and B together; A and C together; B and C together; or A, B, and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment," "some embodiments," "an embodiment," and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that the appended claims should cover variations in the ranges except where this disclosure makes clear the use of a particular range in certain embodiments.

The terms "determine," "calculate," "compute," and variations thereof, as used herein, are used interchangeably, and include any type of methodology, process, mathematical operation or technique.

This disclosure is presented for purposes of illustration and description. This disclosure is not limited to the form or forms disclosed herein. In the Detailed Description of this disclosure, for example, various features of some exemplary embodiments are grouped together to representatively describe those and other contemplated embodiments, configurations, and aspects, to the extent that including in this disclosure a description of every potential embodiment, variant, and combination of features is not feasible. Thus, the features of the disclosed embodiments, configurations, and aspects may be combined in alternate embodiments, configurations, and aspects not expressly discussed above. For example, the features recited in the following claims lie in less than all features of a single disclosed embodiment, configuration, or aspect. Thus, the following claims are hereby incorporated into this Detailed Description, with each claim standing on its own as a separate embodiment of this disclosure.

Advances in science and technology may provide variations that are not necessarily expressed in the terminology of this disclosure although the claims would not necessarily exclude these variations.

What is claimed is:

1. A variable mold comprising:
    a plurality of hydraulic pin systems, each pin system comprising:
        a valve in fluid communication with a supply of pressurized fluid;
        a tubing in fluid communication with the valve; and
        a pin coupled to the tubing, wherein:
        the pin is configured for displacement from the tubing in response to the supply of the fluid through the valve to the tubing,
        a longitudinal axis of each pin is mutually parallel and arranged in a two-dimensional array; and
        each valve is a magnetorheological valve having a magnetic coil and the fluid is a magnetorheological fluid;
    a controller operably coupled to the valves, the controller configured to control a displacement of each pin of the plurality of hydraulic pin systems; and
    a temperature control system comprising a temperature control fluid in contact with each of the valves, wherein the magnetorheological fluid and the temperature control fluid are different fluids.

2. The variable mold according to claim 1, further comprising:
    a pin displacement detector configured to detect a displacement of each pin of the plurality of hydraulic pin systems, the pin displacement detector being operably coupled to the controller.

3. The variable mold according to claim 2, wherein:
    for each pin, the controller is configured to adjust the displacement of the pin by selectively opening or closing the valve corresponding to the pin in response to a detected displacement of the pin.

4. The variable mold according to claim 3, wherein:
    the controller is configured to close the corresponding valve in response to the pin displacement detector detecting that the pin is displaced a predetermined distance corresponding to a desired mold shape.

5. The variable mold according to claim 1, wherein:
each pin is coupled to a heating element at or proximate a distal end of the pin.

6. The variable mold according to claim 1, further comprising:
at least one of thermal insulation and magnetic shielding surrounding each magnetic coil.

7. The variable mold according to claim 1, wherein:
each pin extends at least partly around an exterior of the tubing.

8. The variable mold according to claim 1, wherein:
each pin extends at least partly within an interior of the tubing.

9. The variable mold according to claim 1, wherein:
each valve includes:
    a hollow cylinder extending in a longitudinal direction, the hollow cylinder comprising a cylinder first end, a cylinder second end, and a cylinder interior;
    a center rod provided in the cylinder interior, the center rod comprising a rod first end and a rod second end;
    a first spacer cylinder provided on the center rod at a first position in the longitudinal direction;
    a second spacer cylinder provided on the center rod at a second position in the longitudinal direction;
    a first end plate comprising a first flow opening extending through a thickness of the first end plate, the first end plate coupled to the rod first end;
    a second end plate comprising a second flow opening extending through a thickness of the second end plate, the second end plate coupled to the rod second end; and
    a wire coil provided on an exterior of the hollow cylinder at a third position in the longitudinal direction, the third position being between the first position and the second position, wherein
        an outer diameter of the first spacer cylinder and an outer diameter of the second spacer cylinder are less than an inner diameter of the hollow cylinder.

10. The variable mold according to claim 9, wherein:
each pin is coupled to a heating element.

11. The variable mold according to claim 9, further comprising:
at least one of thermal insulation and magnetic shielding surrounding each magnetic coil.

12. The variable mold according to claim 1, further comprising:
a manifold in fluid communication with the valve of each hydraulic pin system of the plurality of hydraulic pin systems, the manifold comprising a first fluid inlet configured to supply the magnetorheological fluid to the valve of each hydraulic pin system of the plurality of hydraulic pin systems via the manifold.

13. The variable mold according to claim 12, wherein the temperature control system comprises a second fluid inlet configured to supply the temperature control fluid to the manifold.

14. The variable mold according to claim 1, further comprising:
a chamber configured to house the valve of each hydraulic pin system of the plurality of hydraulic pin systems.

15. The variable mold according to claim 14, wherein the temperature control system comprises a fluid inlet configured to supply the temperature control fluid to the chamber.

16. The variable mold according to claim 1, wherein the temperature control fluid is in contact with an exterior of each of the valves.

17. A method for use of a variable mold, the method comprising:
providing a variable mold comprising:
    a plurality of hydraulic pin systems, each pin system comprising:
        a valve in fluid communication with a supply of pressurized fluid;
        a tubing in fluid communication with the valve; and
        a pin coupled to the tubing, wherein:
            the pin is configured for displacement from the tubing in response to the supply of the fluid through the valve to the tubing,
            a longitudinal axis of each pin is mutually parallel and arranged in a two-dimensional array; and
            each valve is a magnetorheological valve having a magnetic coil and the fluid is a magnetorheological fluid;
    a controller operably coupled to the valves, the controller configured to control a displacement of each pin of the plurality of hydraulic pin systems; and
    a temperature control system comprising a temperature control fluid in contact with each of the valves, wherein the magnetorheological fluid and the temperature control fluid are different fluids;
extending each pin to a predetermined position for that pin;
applying a current to each magnetic coil to change a viscosity of the magnetorheological fluid within each valve; and
cooling each valve below a melting point of the magnetorheological fluid.

18. The method of claim 17, further comprising:
heating each valve above the melting point of the magnetorheological fluid.

* * * * *